United States Patent

Hirata et al.

[11] Patent Number: 5,933,255
[45] Date of Patent: *Aug. 3, 1999

[54] DIGITAL IMAGE FORMING APPARATUS

[75] Inventors: Katsuyuki Hirata, Toyokawa; Yoshinobu Hada, Aichi-Ken; Kentaro Katori, Toyokawa; Masahiro Kouzaki, Gamagori, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/610,713

[22] Filed: Mar. 4, 1996

[30] Foreign Application Priority Data

Mar. 7, 1995 [JP] Japan ................................. 7-047402
Feb. 27, 1996 [JP] Japan ................................. 8-039483

[51] Int. Cl.⁶ .................................................. H04N 1/407
[52] U.S. Cl. ..................... 358/501; 358/296; 358/401; 358/444; 347/135; 347/253
[58] Field of Search ................................ 358/298, 296, 358/300, 443, 457, 444, 401, 501, 406, 504; 347/129, 131, 135, 251, 252, 253

[56] References Cited

U.S. PATENT DOCUMENTS

| | | | |
|---|---|---|---|
| 4,074,319 | 2/1978 | Goldschmidt et al. | 358/482 |
| 4,345,243 | 8/1982 | Parsons | 345/194 |
| 4,679,057 | 7/1987 | Hamada | 346/108 |
| 5,258,775 | 11/1993 | Casey et al. | 347/251 |
| 5,270,827 | 12/1993 | Kobayashi et al. | 358/298 |
| 5,390,263 | 2/1995 | Guay et al. | 358/456 |
| 5,420,614 | 5/1995 | Fukui et al. | 358/298 |
| 5,642,439 | 6/1997 | Sato et al. | 358/457 |
| 5,663,814 | 9/1997 | Hada et al. | 358/475 |
| 5,729,362 | 3/1998 | Deishi et al. | 358/520 |
| 5,790,272 | 8/1998 | Goto et al. | 358/460 |
| 5,828,397 | 10/1998 | Goto et al. | 347/131 |
| 5,835,235 | 11/1998 | Goto et al. | 358/406 |

*Primary Examiner*—Peter S. Wong
*Assistant Examiner*—Derek J. Jardieu
*Attorney, Agent, or Firm*—Burns, Doane, Swecker & Mathis, LLP

[57] ABSTRACT

In a digital image forming apparatus, when a latent image is formed on a photoconductor by modulating optical intensity of laser beam, the laser beam is emitted in a period of a duty ratio while modulated according to image data, and the image is formed on a sheet of paper. This process is repeated for four colors for a color document. The duty ratio, defined as a ratio of a light-emitting time of a light exposing the photoconductor to a period for exposing a dot, is changed in the same document. For example, the light emission timing pattern is changed between odd and even lines. In another example, the light-emission timings may be changed at least for one of the reproduction colors. The light-emission timing patterns may be provided for each of reproduction colors. The light-emission timing patterns may be changed to have a constant or different screening angle between colors. Image quality of a half-tone image is improved by using such patterns.

25 Claims, 24 Drawing Sheets

DIGITAL IMAGE FORMING APPARATUS

BACKGROUND OF THE INVENTION

1. Field of the Invention

The present invention relates to a digital image forming apparatus such as a digital copying machine which forms an electrostatic latent image with optical intensity modulation.

2. Description of the Prior Art

In a digital image forming apparatus, a laser beam is modulated to form an electrostatic latent image on a photoconductor. Optical intensity modulation technique is one modulation technique for forming an electrostatic latent image with a laser beam. In the optical intensity modulation technique, an optical intensity of a laser beam for exposing a photoconductor is modulated according to image data of each pixel. Because modulation is performed in the unit of a pixel, a density is expressed for an image data of one pixel, and both gradation and resolution of a reproduced image are good.

However, it is difficult to stabilize gradation reproduction in a high-lighted portion in an image where delicate density control is needed. Further, granularity at a half-tone portion is liable to become worse due to random noises. It is proposed to decrease duty ratio of light-emitting time of laser beam less than 100% in the optical intensity modulation technique in order to improve granularity and stability of gradation reproduction. However, it is disadvantageous that resolution is deteriorated by fine lines in an image due to non-light-emitting periods.

SUMMARY OF THE INVENTION

An object of the present invention is to provide an image forming apparatus which improves granularity at a half-tone portion in an image, keeps good resolution and improves gradation reproduction at a half-tone portion.

A memory means stores a plurality of light-emission pattern data having different timing of light-emission/non-light-emission along a main scan direction. Then, light emission is controlled along a sub scan direction by reading the data stored in the memory means. Then, light-emission pattern can be changed for each line along a subscan direction. For example, light-emission pattern is changed between odd lines and even lines. The light-emission pattern may be changed for at least one of the reproduction colors for reproduction of a full color image.

In one aspect of a digital image forming apparatus of the invention, an image is formed on a photoconductor with a light beam by modulating an optical intensity for each pixel according to image data for gradation expression. The light beam has a light emission timing pattern having a non-light emitting period. A plurality of light emission timing patterns are stored in a memory means. When an image is formed, one of the light emission timing patterns is used for forming an image. For example, a first pattern is used for odd lines, and a second pattern is used for even lines. When an image is formed with a plurality of reproduction colors, light emission patterns may be selected to be different among the reproduction colors. In another aspect of the invention where an image is formed with a plurality of reproduction colors, a plurality of sets of light emission timing patterns is provided for the reproduction color, and when an image is formed with a reproduction color, one of the sets of light emission timing patterns is used. Such light emission timing patterns may be used in various ways. For example, each set of light emission timing patterns may be defined for each reproduction color. It is also possible to use one of the sets in turn as a reproduction is changed. The patterns may be defined to produce a predetermined screen angle, and the screen angle may be different among reproduction colors.

An advantage of the present invention is that image quality of a reproduced image is improved by setting different duty ratios for the same document in the intensity modulation technique.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
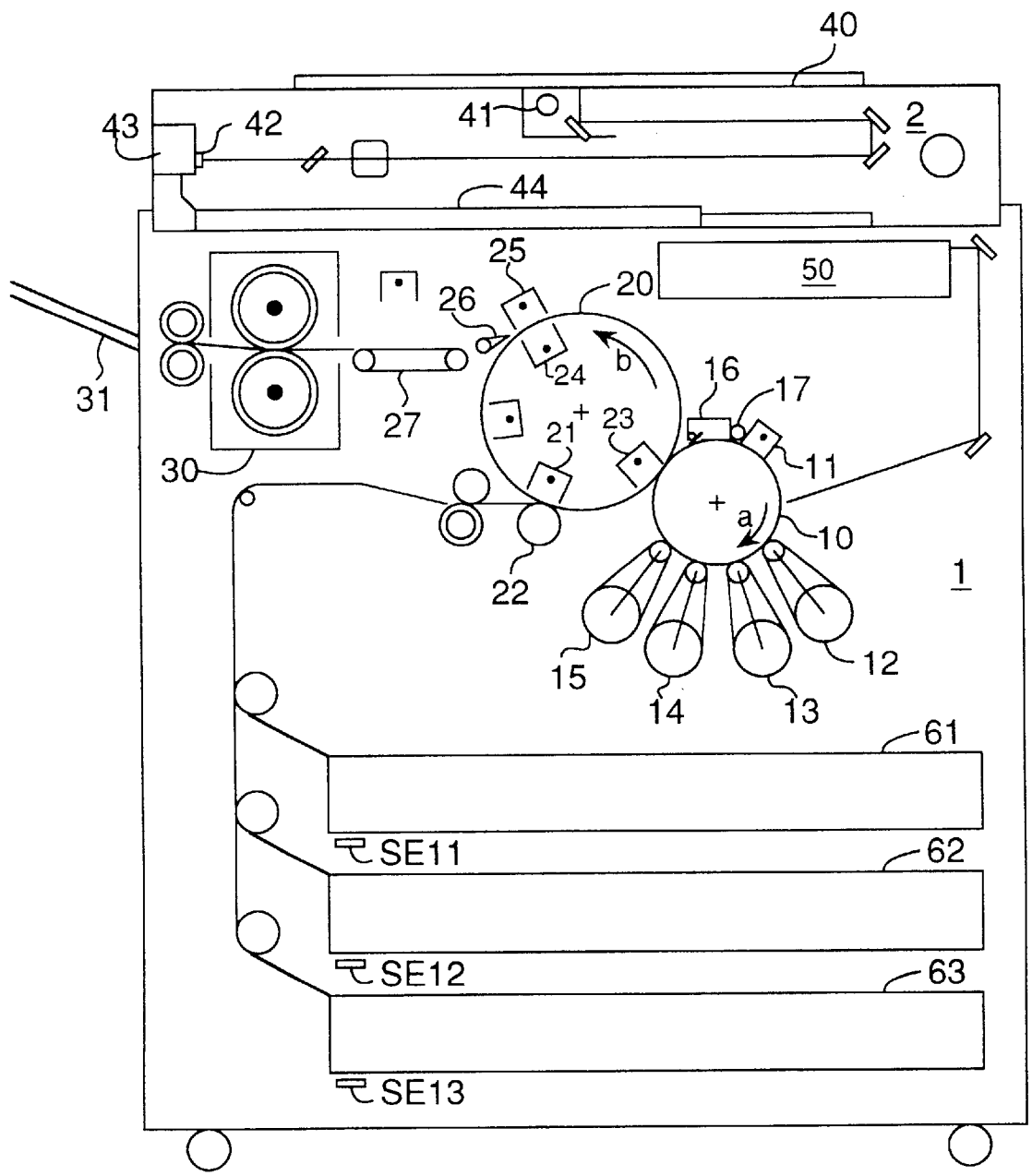
FIG. 1 is a schematic sectional view of a copying machine.

Referring now to the drawings, wherein like reference characters designate like or corresponding parts throughout the views, FIG. 1 shows a digital full color copying machine schematically. The digital copying machine comprises an image reader 2 for reading a document image and a printer 1 for reproducing the read image.

In the image reader 2, a scanner 41 scans on a document put on a platen 40 while exposing the document. Then, a light reflected from the document is detected with an optical section 43 including a CCD sensor 42. The detected light is converted by photoelectric conversion to electric signals of red, green and blue for each pixel, and they are sent to an image signal processor 44 (refer to FIG. 2) as analog data of reflectance.

In the printer 1, a photoconductor drum 10 is provided to be rotated along a direction denoted with an arrow "a", and a transfer drum 20 is also provided near the photoconductor drum 10 to be rotated along a direction denoted with an arrow "b". An eraser lamp 17, a sensitizing charger 11, development units 12, 13, 14 and 15 of four colors of cyan, magenta, yellow and black, a transfer charger 23, and a cleaning unit 16 for cleaning remaining toners are located around the photoconductor drum 10 successively. An image is formed with a laser beam by a print head unit 50 on the photoconductor drum 10 just after the photoconductor has been sensitized. On the other hand, a charger 21 for absorbing a paper, a roller 22 for absorbing the paper, a transfer charger 23, chargers 24 and 25 for separating the paper and a claw 26 for separating the paper are located around the transfer drum 220 successively.

Figure 2:
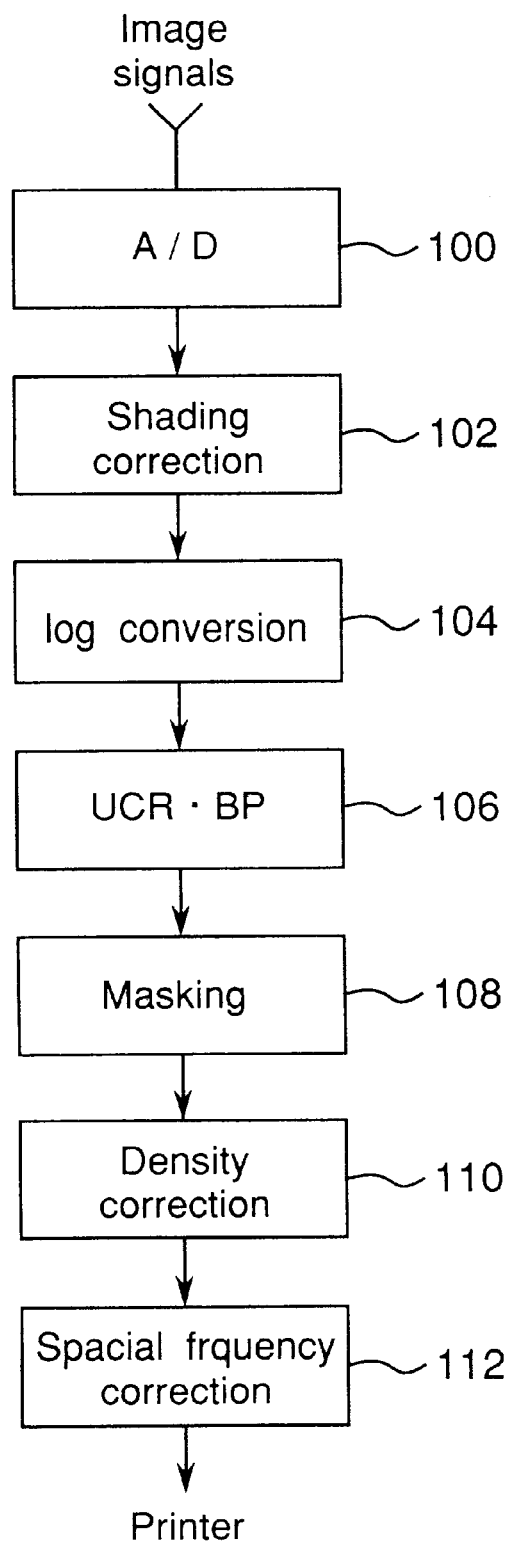
FIG. 2 is a block diagram of an image signal processor.

FIG. 2 is a block diagram of the image signal processor 44. Image processing from the CCD sensor 42 through the image signal processor 44 to a printer controller is explained with reference to FIG. 2. The CCD sensor 42 has been adjusted on an offset and a gain thereof. The image signals of reflected light of red, green and blue from the CCD sensor 42 are converted by the analog-to-digital converter 100 to multi-level digital values, which are subjected to shading correction by the shading correction circuit 102. Then, the corrected digital values are converted to density data by a log converter 104, while they are also converted to color coordinates of value (V), hue (H) and chroma (C) by a color conversion processor. Next, a UCR/BP processing circuit 106 obtains a common portion of the three data of red, green and blue as black data and decreases the three data by the common portion. Then, the masking circuit 108 converts the data of red, green and blue to data of cyan, magenta, yellow and black. A density correction circuit 110 multiplies the data of cyan, magenta, yellow and black with prescribed coefficients in order to correct the density data or to reduce a difference from ideal characteristic by the color correction. Finally, a spacial frequency correction circuit 112 performs smoothing and the like according to features of the image, and sends the data after these processings as print data to the printer 1.

Returning to FIG. 1, in the print head unit 50, as will be explained later, the electric signals received from the CCD sensor 42 are digitalized and converted to density data, and gradation correction or gamma correction is performed on the density data according to image reproduction characteristics of the photoconductor and the toners, and the like. Then, the data are converted again to analog data as exposure data. Then, a laser is driven according to the exposure data to expose the rotating photoconductor drum 10. Before the exposure, the photoconductor drum 10 is irradiated by the eraser lamp 17 and sensitized uniformly by the charger 11. When the photoconductor drum 10 is exposed by a laser beam, a latent image of the document image is formed thereon. The development units 12–15 has two-component toners consisting of toners and carriers, and they are arranged opposed to the photoconductor drum 10. Then, the latent image is developed by one of the development units 12–15 to form a visual toner image on the latent image.

On the other hand, three paper cassettes 61, 62 and 63 are provided in the printer 1. The size of papers in the cassettes 61, 62 and 63 is detected by sensors SE11, SE12, SE13. A paper feed by one of the cassettes 61–63 is carried onto the transfer drum 20 in synchronization with an absorption position thereon, and it is absorbed on a film electrostatically with the absorption roller 22 and the absorption charger 21. The image developed on the photoconductor drum 10 is transferred by the transfer charger 23 onto the paper absorbed on the transfer drum 20.

The above-mentioned process of image reading, latent image forming, development and transfer is repeated four times for a full color image (or necessary times). Then, the paper is separated from the transfer drum 20 by the chargers 24, 25 and the claw 26 and carried by a carrier 27 to the fixing unit 30. Then, the toner image is fixed and discharged onto the tray 31.

Figure 3:
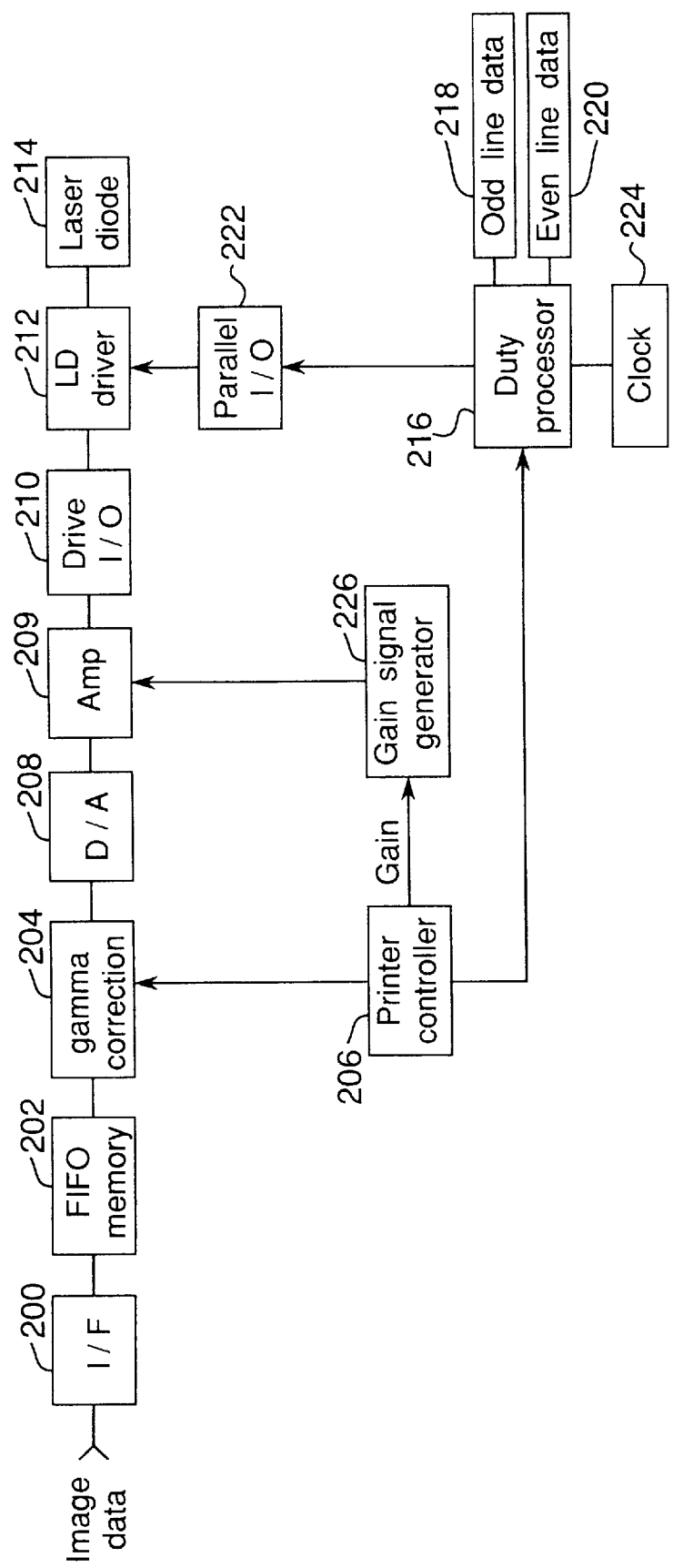
FIG. 3 is a block diagram of image data processing in a printer.
Figure 4:
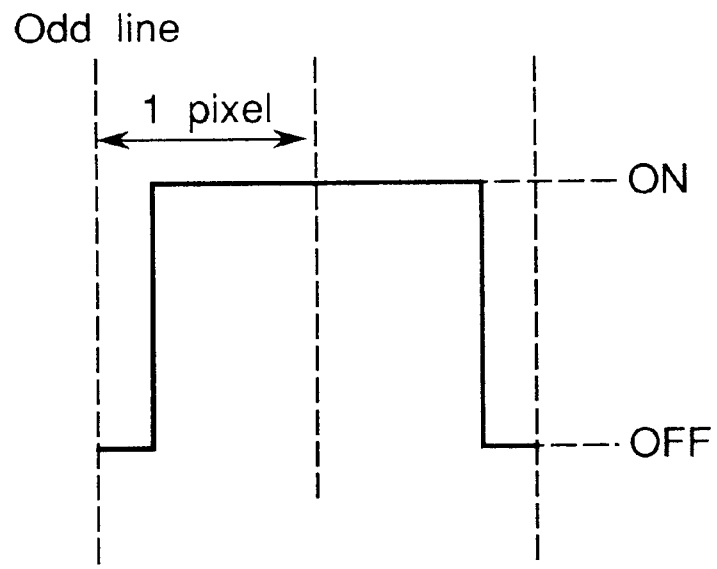
FIG. 4 is a timing chart of an example of duty signal for an odd line.

FIG. 3 shows image data processing in the print head 50 in the printer 1. An 8-bit image data from the image signal processor 44 is received through an interface 200 by a first-in first-out memory (hereinafter referred to as FIFO memory) 202. The FIFO memory 202 is a line buffer memory which can store gradation data of image of a prescribed number of lines along the main scan direction, and it is provided to absorb a difference in clock frequencies between the image reader 2 and the printer 1. Next, the data in the FIFO memory 202 is sent to a gamma correction section 204, which performs gamma correction (gradation correction) on the input signal (ID) according to image reproduction characteristics of the photoconductor and the toners by using gamma correction data received from a printer controller 206 in response to the duty ratio. The data after the gamma correction are converted to analog data by a digital-to-analog converter 208 as disclosure data. The disclosure data is converted next by an amplifier 209 with a gain generated by a gain signal generator 226 according to a gain signal set by the printer controller 206, and is sent through a drive input/output circuit 210 to a driver 212 for driving a laser diode 212.

Further, the printer controller 206 sends a signal to a duty processor 216. A duty processor 216 sends a duty signal in correspondence to a duty data 218, 220 through a parallel input/output circuit 222 to the driver 214. These duty data 218, 220 are stored in a memory. Thus, the laser diode 214 is driven for a time only when the duty signal is output. On the other hand, a clock generator 224 sends clock signals of a frequency of four times the modulation frequency through the parallel input/output circuit 222 to the driver 212. Then, the laser diode 214 is turned on or off in the unit of a quarter (25%) of one pixel. By dividing one dot into four and driving the laser diode with a specified duty ratio, a dot-like image is formed. Further, by controlling the timing of turning on/off the laser diode 214 for each subscan line, a screen angle is formed.

In this embodiment, the duty signals 218 and 220 for odd and even lines are ON/OFF signals for the laser diode 214 in a period of two pixels, and a phase of the duty signals are reversed between an odd line and an even line in a two-pixel period. In general, first and second light-emission patterns are stored in a memory. The first light-emission pattern controls a light-emission timing along main scan direction in a period of N dots (N=2 in this embodiment) and the second light-emission pattern has light-emission timing shifted by N/2 dots from that of the first one. The first and second light-emission patterns are changed every line. More generally, the light-emission timing is shifted between odd lines and even lines.

Figure 5:
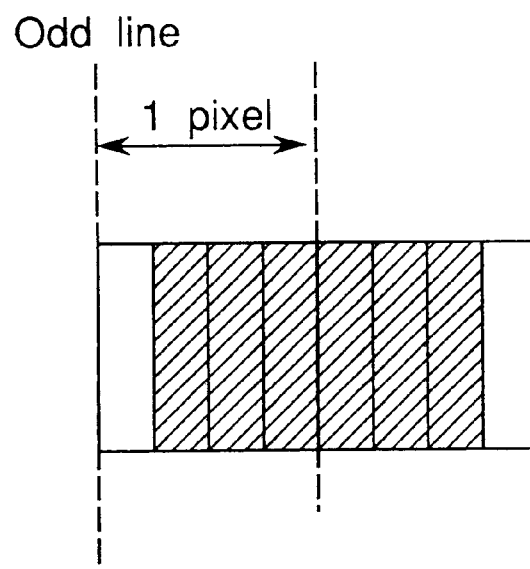
FIG. 5 is a diagram of dots for the signal shown in FIG. 4.
Figure 6:
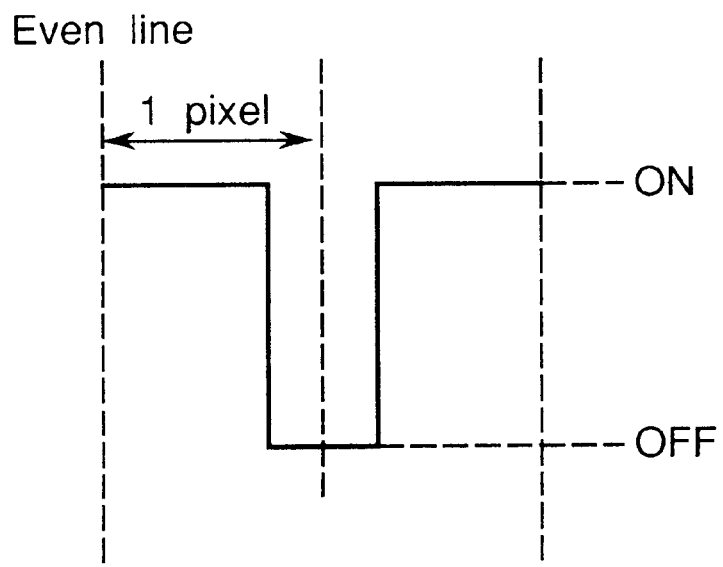
FIG. 6 is a timing chart of an example of duty signal for an even line.
Figure 7:
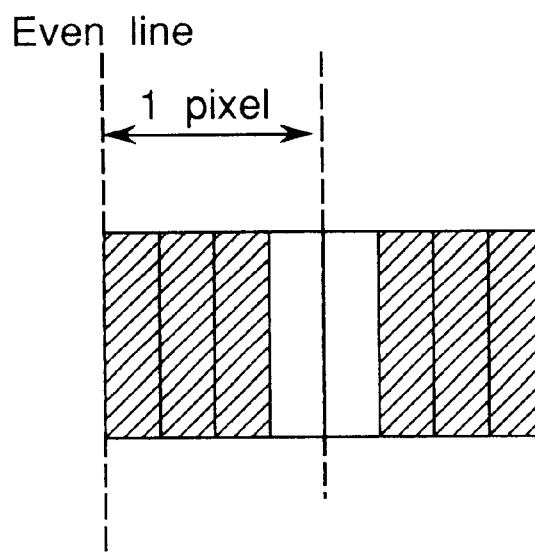
FIG. 7 is a diagram of dots for the signal shown in FIG. 6.

FIGS. 4–7 illustrate an example where duty ratio defined as a ratio of light-emitting time to an entire period is set 75%. A signal for odd line shown in FIG. 4 has duty ratio of 75% per pixel. The signal has a period of two pixels. Then, light emission is not performed in 25% of a period for a first pixel, while it is performed in the remaining 75% of the period of the first pixel. Then, light emission is performed in 75% of a period for a second pixel, while it is not performed in the remaining 25% of the period of the second pixel. The laser beam exposes the photoconductor drum in the light-emission period. FIG. 5 shows dots produced with the duty signal shown in FIG. 4. That is, a hatched area in FIG. 5 shows an area to which toners adhere. Similarly, as to even lines, a duty signal shown in FIG. 6 has duty ratio of 75% per pixel. The signal has also a period of two pixels. Then, light emission is performed in 75% of a period for a first pixel, while it is not performed in the remaining 25% of the period. Then, light emission is not performed in 25% of a period for a second pixel, while it is performed in the remaining 75% of the period of the second pixel. FIG. 7 shows dots produced with the duty signal shown in FIG. 6, and a hatched area in FIG. 7 shows an area to which toners adhere.

Figure 8:
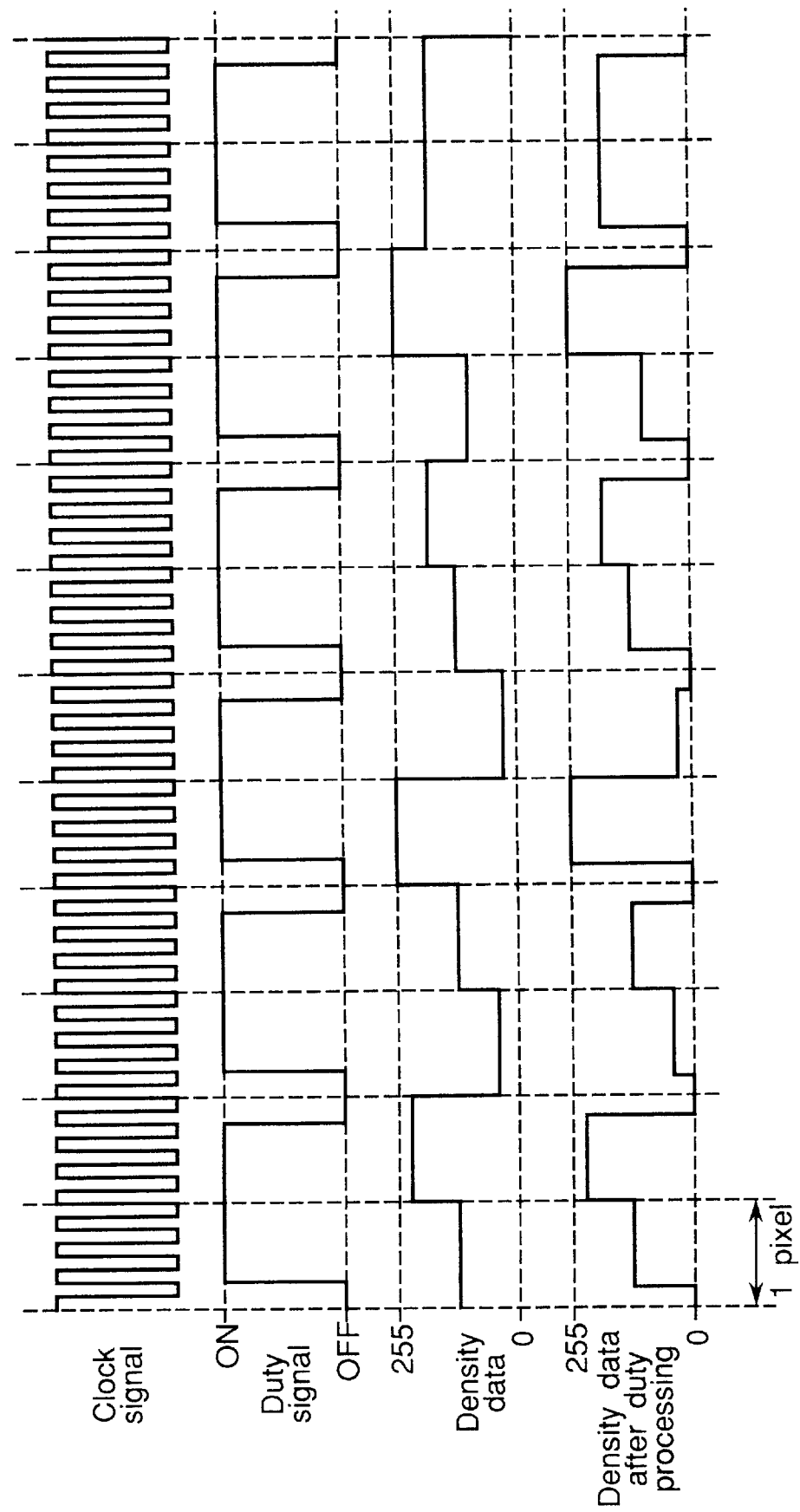
FIG. 8 is a timing chart of an example of duty clock signal, duty signal and density data for an odd line.

FIG. 8 shows an example of a timing chart for odd line of duty clock signal, duty signal, density data and image data. Duty clock signals have a period of four times that of modulation frequency. The duty ratio is set to be 75%, and a period of the duty signal is two pixels. Optical intensity of laser beam of the laser diode 214 is modulated according to density data. The LD driver 212 processes the density data with the duty ratio to generate the density data shown at the bottom in FIG. 8.

Figure 9:
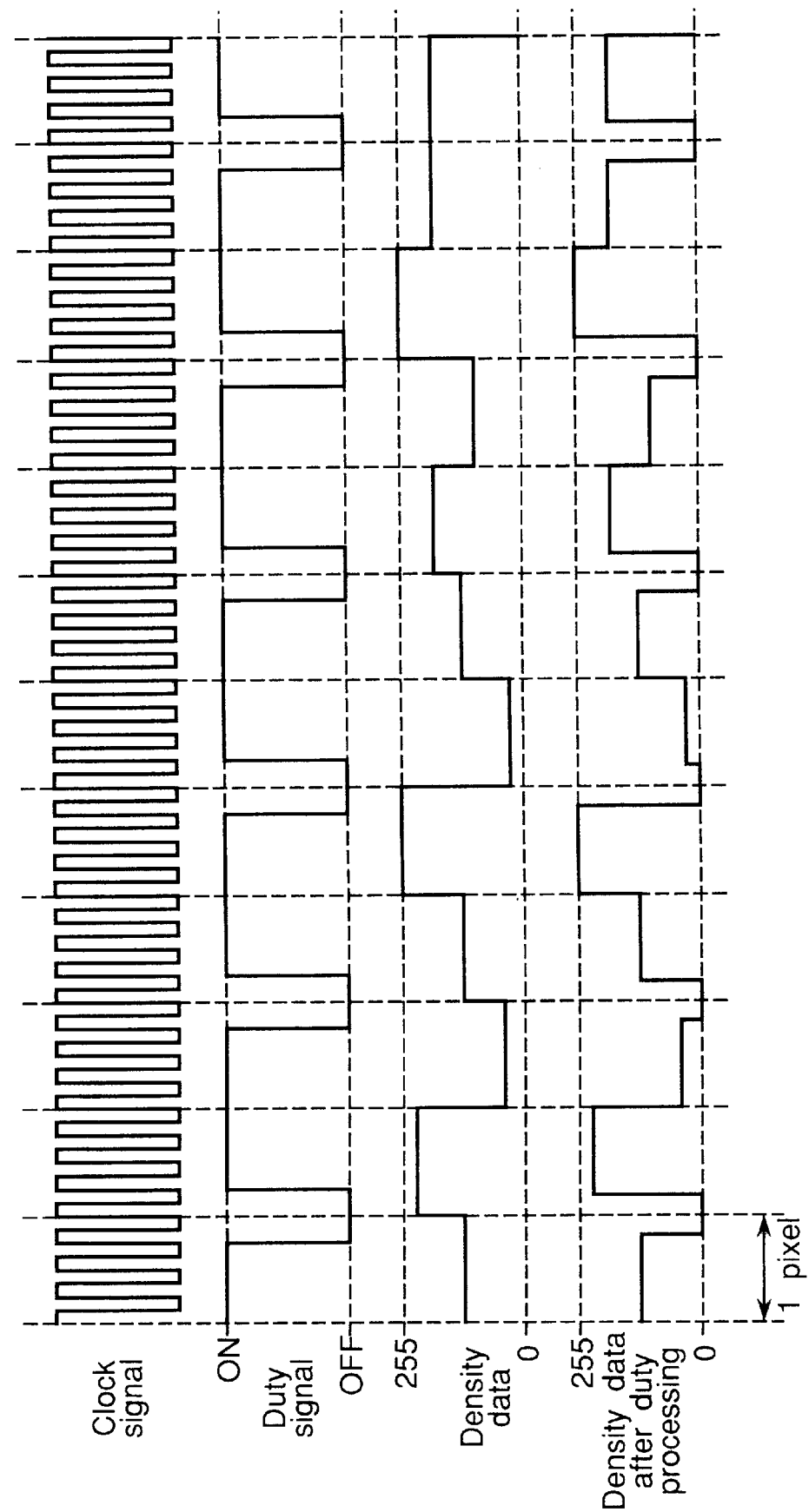
FIG. 9 is a timing chart of an example of duty clock signal, duty signal and density data for an even line.

FIG. 9 shows an example of a timing chart for even line of duty clock signal, duty signal, density data and image data. The density data are modulated with the duty signal, and similar results are obtained except its phase.

Figure 10:
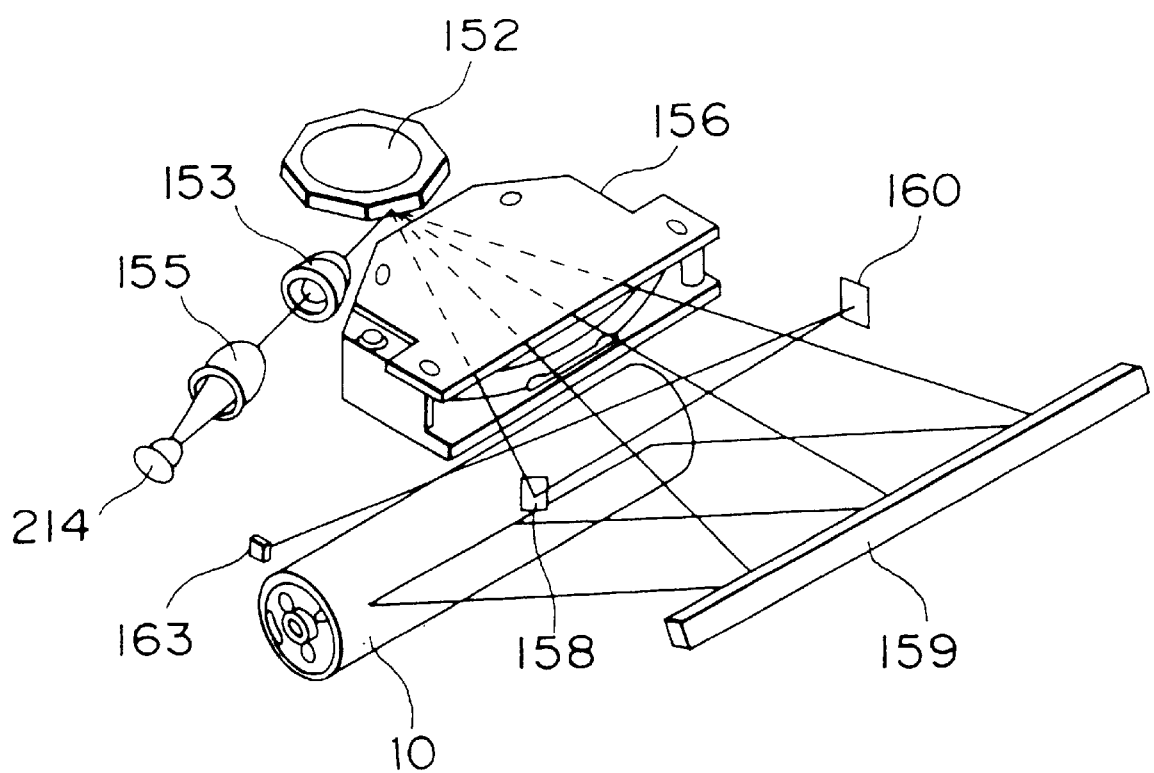
FIG. 10 is a perspective view of an optical system of the printer.

FIG. 10 is perspective view of an optical system in the printer 2. A laser beam emitted by the laser diode 214 transmits a collimator lens 155 and a cylindrical lens 153 to be reflected at a plane of a rotating polygon mirror 152. A beam reflected at the plane transmits an f-θ lens 156 and is reflected again by a mirror 159. Then, it passes a slit (not shown) to go out of the optical system to expose the photoconductor drum 10. As the polygon mirror 152 rotates, the direction of the beam changes, to scan on the photoconductor drum 10 along the axial direction. In order to detect a start of scan for synchronizing the scan along the axial direction, the laser beam is reflected by mirrors 158, 160 to be incident on a photodiode 163.

When the photodiode 163 detects a start of scan of a first scan line, a scan of the first scan line is started according to the optical intensity, the duty signal and the clock signals received through the drive input/output circuit 210 and the parallel input/output circuit 222. When the photodiode 163 detects a start of scan of a second scan line, a scan of the second scan line is performed similarly. Duty signals for odd lines are used for third, fifth, . . ., (2n–1)th lines (where n is a natural number), while duty signals for even lines are used for fourth, sixth, . . ., 2n-th lines. Thus, a latent image is formed in an effective image area.

Figure 11:
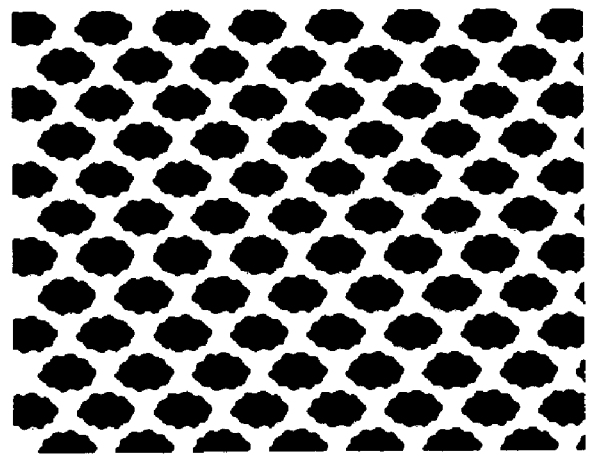
FIG. 11 is a diagram of an example of a dot pattern.

FIG. 11 shows an example of an image formed by changing light-emission timing (or the phase of the duty ratio) for each line by using the duty signal of duty ratio of 75% and of a period of two dots. As shown in FIG. 11, a dot image having a screen angle of 45° is formed by using optical intensity modulation technique. Then, pitch noises due to fine lines can be vanished. In this example, the light timings of cyan, magenta, yellow and black for odd lines and for even lines are the same. Then, a dot image of the four colors having a screen angle of 45° is formed.

As described above, two time emission timing patterns are provided in this embodiment. Then, one of the two patterns are read for a line for modulating the laser beam. In the image data processing shown in FIG. 3, two time emission timing patterns are read alternately, and the time emission timing pattern is changed between the odd lines and even lines.

In this embodiment, the light-emitting timings of cyan, magenta, yellow and black for odd lines and for even lines are the same, but they need not be the same for all the reproduction colors. For example, if the light-emitting timings of black for odd lines and for even lines are the same as those of cyan, magenta and yellow for odd lines and for even lines, when a black image is formed, non-light-emission portions of black do not overlap the light-emission portion of the other colors. Because the timings for black are shifted by one dot from those of the other colors, a color Moire pattern can be reduced when four colors are lapped to form a full color image. Black overlaps other colors extending to the non-light-emission portions. Because a color Moire pattern is ascribed to periodic shift of dots of each color. Thus, a Moire pattern is effectively prevented by covering the non-light-emission portions. In a modified way, light emitting timing patterns may be selected according as a reproduction color is changed.

A latent image can be formed surely by concentrating a laser energy in a light-emission period of a constant duty ratio. Thus, stability of reproduction in a high-light portion is improved, and generation of random noises is reduced. By shifting dot positions between odd lines and even lines, distance between dots can be increased, so that reproducibility of dots can be improved.

Figure 12:
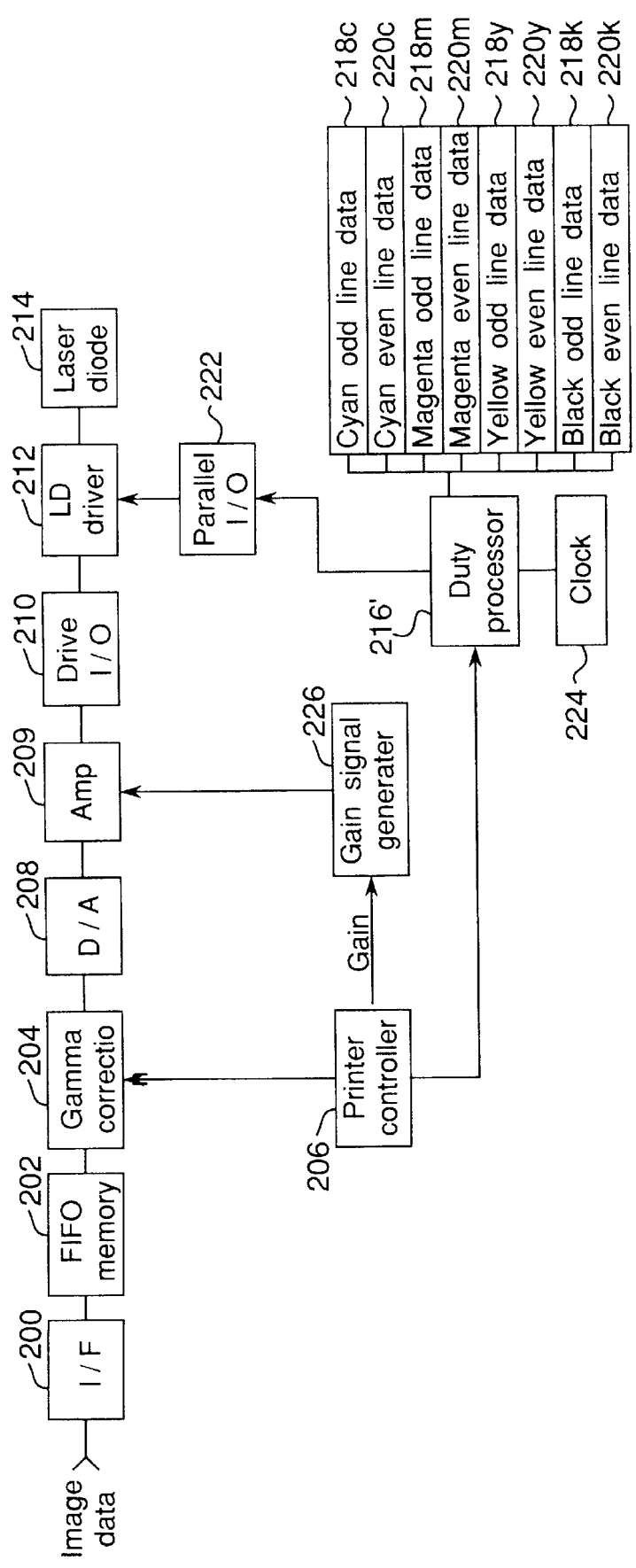
FIG. 12 is a block diagram of image data processing in a printer in a second embodiment.

Next, a second embodiment is explained. Only differences from the first embodiment are explained. FIG. 12 shows image data processing in a printer 2 in this embodiment. The image data processing is different from that of the first embodiment shown in FIG. 3 in that odd line data 218c, 218m, 218y and 218k for cyan, magenta, yellow and black and even line data 220c, 220m, 220y and 220k for cyan, magenta, yellow and black are used instead of the odd line data 218 and the even line data 220 and that a duty processor 216' deals these data. These duty data are stored in a memory.

A printer controller 206 sends a signal to a duty processor 216'. The duty processor 216' sends a duty signal in correspondence to duty data 218c, 220c for a first color, cyan, through a parallel input/output circuit 222 to the driver 212. The duty signals 218c and 220c are similar to those shown in FIGS. 4 and 6 having a duty ratio of 75% and a period of two pixels. Thus, the laser diode 214 is driven for a time only when the duty signal is output. On the other hand, a clock generator 224 sends clock signals of a frequency of four times the modulation frequency through the parallel input/output circuit 222 to the driver 212. Then, the laser diode 214 is turned on or off in the unit of a quarter of one pixel period. Though the duty signal has a two-pixel period for odd and even lines, the density data is supplied in the unit of one pixel. Thus, the resolution is kept the same as 400 dots per inch for a case using the same light emitting timing. As will be understood, FIGS. 8 and 9 in the first embodiment also show an example for one of the four colors, cyan, of a relation of duty clock signal, duty signal and density data for an even line and for an odd line.

When the photodiode 163 detects a start of scan of a first scan line, a scan of the first scan line is started according to the optical intensity, the duty signal and the clock signals received through the drive input/output circuit 210 and the parallel input/output circuit 222. When the photodiode 163 detects a start of scan of a second scan line, a scan of the second scan line is performed similarly. Duty signals for odd lines are used for third, fifth, . . ., (2n−1)th lines (where n is a natural number), while duty signals for even lines are used for fourth, sixth, . . ., 2n-th lines. Thus, a latent image is formed in an effective image area.

Figures 13A, 13B:
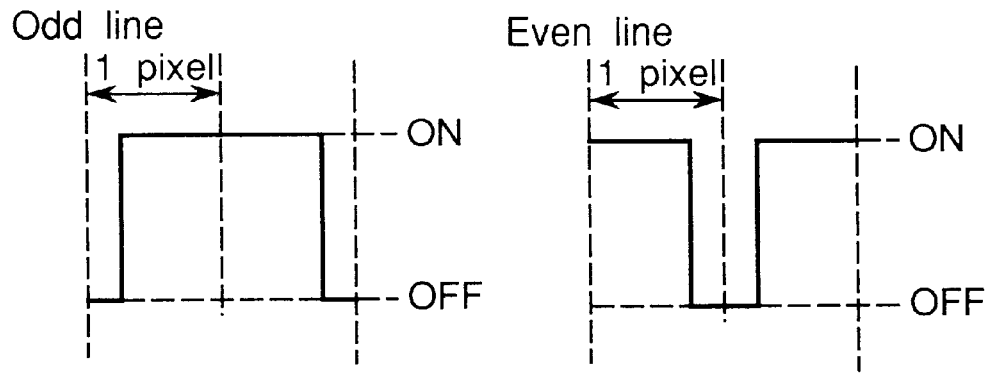
FIGS. 13A and 13B are timing charts of an example of duty signals for magenta for an odd line and for an even line.
Figures 14A, 14B:
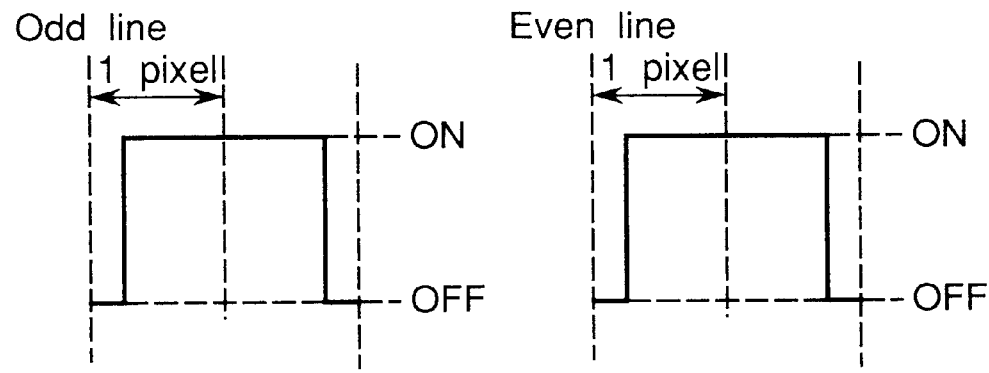
FIGS. 14A and 14B are timing charts of an example of duty signals for yellow for an odd line and for an even line.
Figures 15A, 15B:
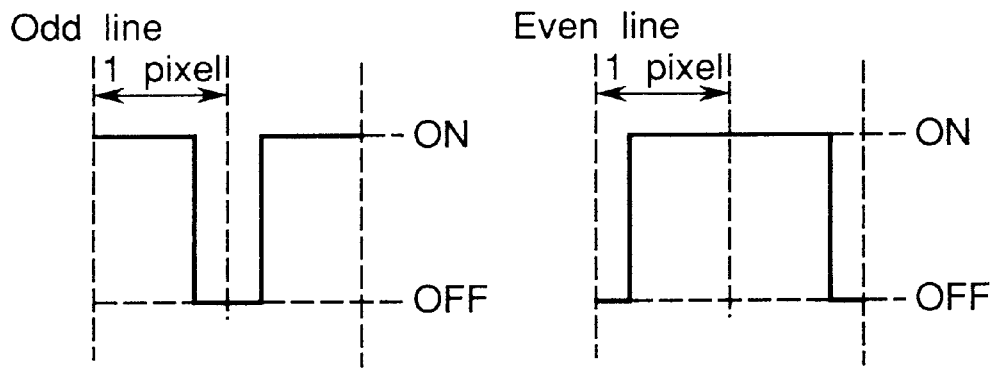
FIGS. 15A and 15B are timing charts of an example of duty signals for black for an odd line and for an even line.
Figure 16A:
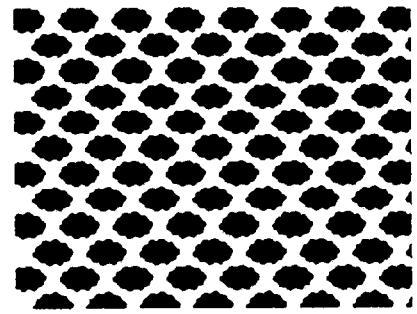
FIGS. 16A, 16B, 16C and 16D are diagrams of dot patterns for cyan, magenta, yellow and black.
Figure 16B:
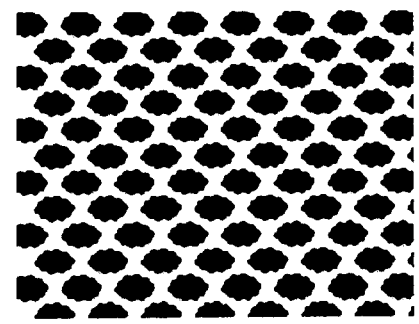
Figure 16C:
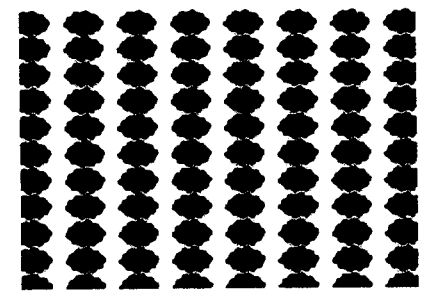
Figure 16D:
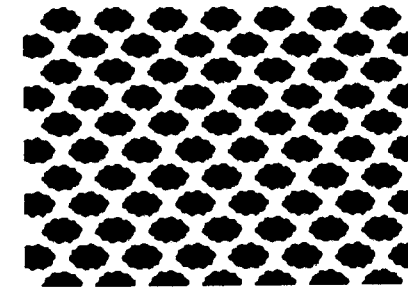

FIGS. 13A and 13B show an example of duty signals for magenta for odd lines and even lines. Similarly, FIGS. 14A and 14B show an example of duty signals for yellow for odd lines and even lines, and FIGS. 15A and 15B show an example of duty signals for black for odd lines and even lines. The duty signals for magenta are similar to those of cyan shown in FIGS. 4 and 6. On the other hand, duty signals for black shown in FIGS. 15A and 15B for odd lines and for even lines are the same as those for magenta for even lines and for odd lined shown in FIGS. 6 and 4. That is, the phase of the duty signal for black is shifted by one pixel from that for magenta. Further, the duty signal for yellow shown in FIGS. 14A and 14B, the phase of duty signal is the same between odd lines and even lines.

By referring again to FIG. 12, after an image of the document is read for the second color, the printer controller 206 sends a signal to the duty processor 216. The duty processor 216' sends a duty signal in correspondence to duty data 218m, 220m for the second color, magenta, through the parallel input/output circuit 222 to the driver 212, similarly to for the first color. Third and fourth colors, yellow and black, are also processed similarly by using duty data 218y, 220y for the third color, yellow, and duty data 218k, 220k for the fourth color, black. At least one of the four colors has a phase relation reversed between the odd and even lines with respect to that of another color. In the second embodiment, cyan and black have this relation, and the data 218c corresponds to the data 220k while the data 218k corresponds to the data 220c.

The above-mentioned process is repeated four times for a full color image. Then, the paper is separated from the transfer drum 20, carried by the carrier 27 and fixed by the fixing unit 30. FIGS. 16A, 16B, 16C and 16D show an example of images of cyan, magenta, yellow and black, formed by changing light-emission timing (or the phase of the duty ratio) for each line by using the duty signal of duty ratio of 75% and of a period of two dots. It is apparent that a dot image having a screen angle of 45° can be formed by using optical intensity modulation technique, as in FIGS. 16A, 16B and 16D. In this example, light-emission timings for black are changed from those of the other colors. Thus, non-light emission portions of black do not overlap those of the other colors. Then, a color Moire pattern is reduced when four colors are overlapped.

Figure 17:
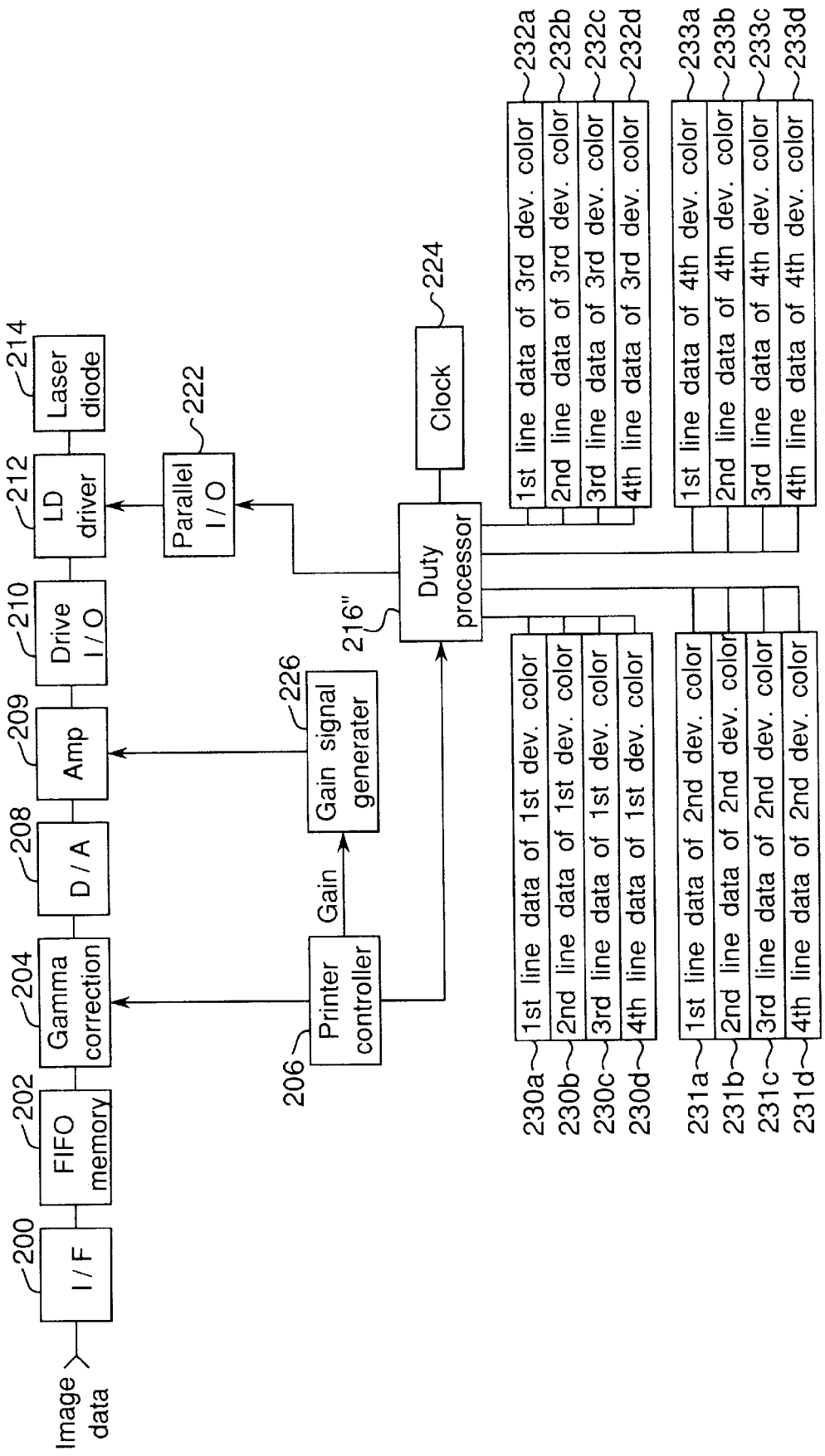
FIG. 17 is a block diagram of image data processing in a third embodiment when a pattern of screen angle of 26.6° is formed.
Figure 18A:
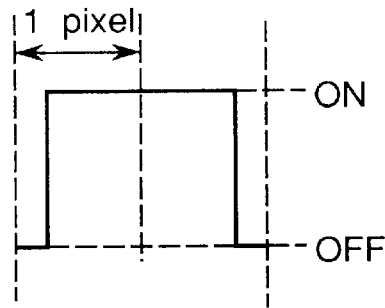
FIGS. 18A, 18B, 18C and 18D are timing charts of an example of duty signals for a first development color for a first line, for a second line, for a third line and for a fourth line.
Figure 18B:
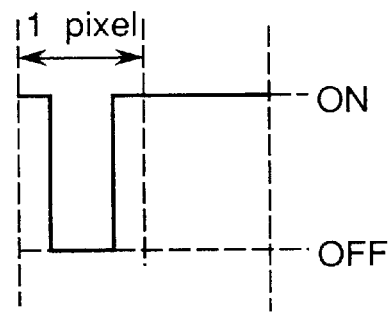
Figure 18C:
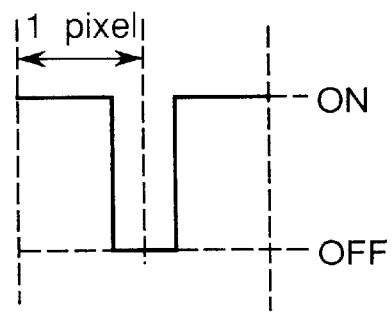
Figure 18D:
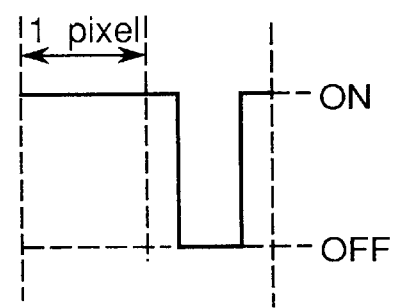
Figure 19A:
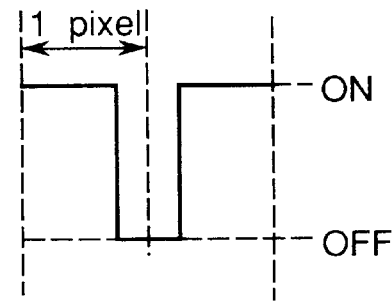
FIGS. 19A, 19B, 19C and 19D are timing charts of an example of duty signals for a second development color for a first line, for a second line, for a third line and for a fourth line.
Figure 19B:
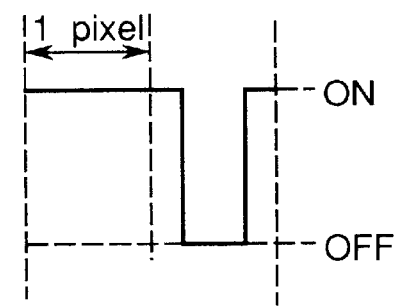
Figure 19C:
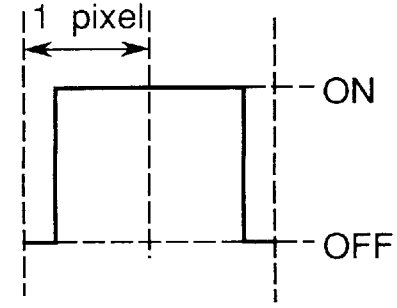
Figure 19D:
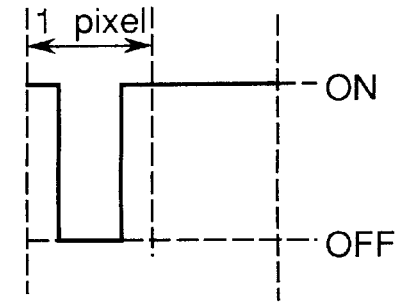
Figure 20A:
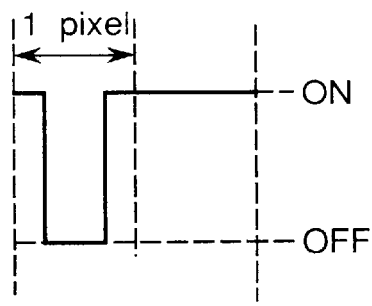
FIGS. 20A, 20B, 20C and 20D are timing charts of an example of duty signals for a third development color for a first line, for a second line, for a third line and for a fourth line.
Figure 20B:
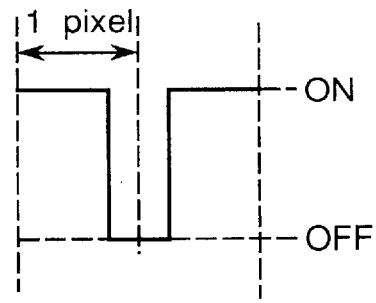
Figure 20C:
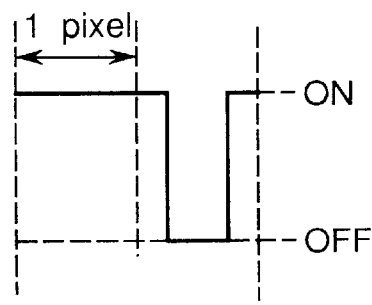
Figure 20D:
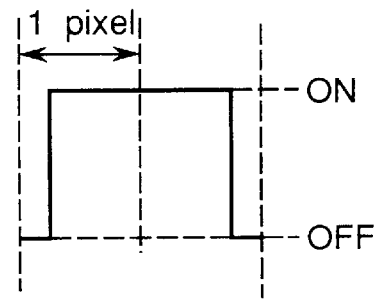
Figure 21A:
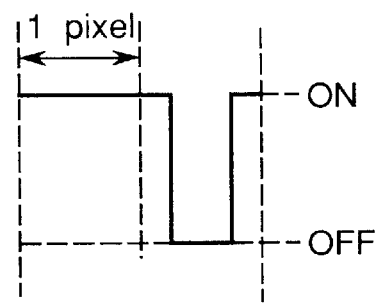
FIGS. 21A, 21B, 21C and 21D are timing charts of an example of duty signals for a fourth development color for a first line, for a second line, for a third line and for a fourth line.
Figure 21B:
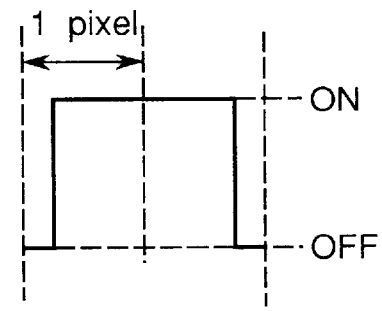
Figure 21C:
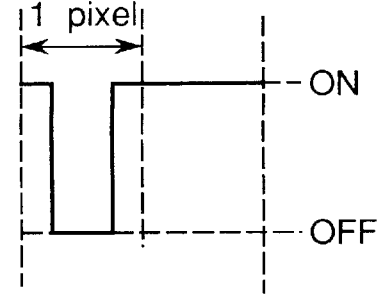
Figure 21D:
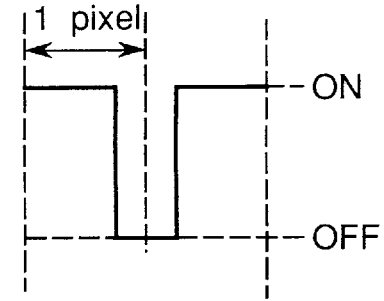

Next, a third embodiment of the invention is explained where screen angles of the first to fourth development colors are all fixed at 26.6° when an image is formed. Only differences from the second embodiment are explained. FIG. 17 shows image data processing in a printer 1 in this embodiment. The image data processing is different from that of the first embodiment shown in FIG. 12 in that various duty data 230a–233d for first to fourth lines are used instead of the duty data 218c–220k for odd and even lines and that a duty processor 216" deals these data. The duty data includes first line data 230a (refer to FIG. 18A), second line data 230b (refer to FIG. 18B), third line data 230c (refer to FIG. 18C) and fourth line data 230d (refer to FIG. 18D) for a first development color, first line data 231a (refer to FIG. 19A), second line data 231b (refer to FIG. 19B), third line data 231c (refer to FIG. 19C) and fourth line data 231d (refer to FIG. 19D) for a second development color, first line data 232a (refer to FIG. 20A), second line data 232b (refer to FIG. 20B), third line data 232c (refer to FIG. 20C) and fourth line data 232d (refer to FIG. 20D) for a third development color, first line data 233a (refer to FIG. 21A), second line data 233b (refer to FIG. 21B), third line data 233c (refer to FIG. 21C) and fourth line data 233d (refer to FIG. 21D) for a fourth development color. These duty data are stored in a memory. When a duty processor 216" receives a signal from a printer controller 206 for starting reproduction, it sends duty signals 230a, 230b, 230c, 230c through a parallel input/output circuit 222 to a laser diode driver 212 when reproduction with the first development color is performed. Next, the duty processor 216" sends duty signals 231a, 231b, 231c, 231c through the parallel input/output circuit 222 to the laser diode driver 212 when reproduction with the second development color is performed. This processing is also performed on the third and fourth development colors, if necessary.

It is a feature of this embodiment that the duty data 230a–233d for first to fourth lines are used instead of the duty data 218c–220k for odd and even lines in the second embodiment. It is another feature that the first to fourth development colors defined for the duty data 230a–233d in this embodiment is related to the order of image forming process whereas the duty data 218c, 218m, 218y and 218k, 220c, 220m, 220y and 220k in the second embodiment are defined for reproduction colors of cyan, magenta, yellow and black. For example, when a full color image is formed, the first to fourth development colors correspond with, for example, cyan, magenta, yellow and black. When a green image is formed, the first and second development colors correspond with, for example, yellow and cyan.

The light-emission pattern shown in FIGS. 18–21 have a period of two pixel and a duty ratio of 75%. It is apparent that the patterns in each line for the four colors are different from each other for each of the four colors. Further, the light-emission patterns of a development color are also different in the four successive lines in order to form an image having screen angles of 22.6°.

Figure 22:
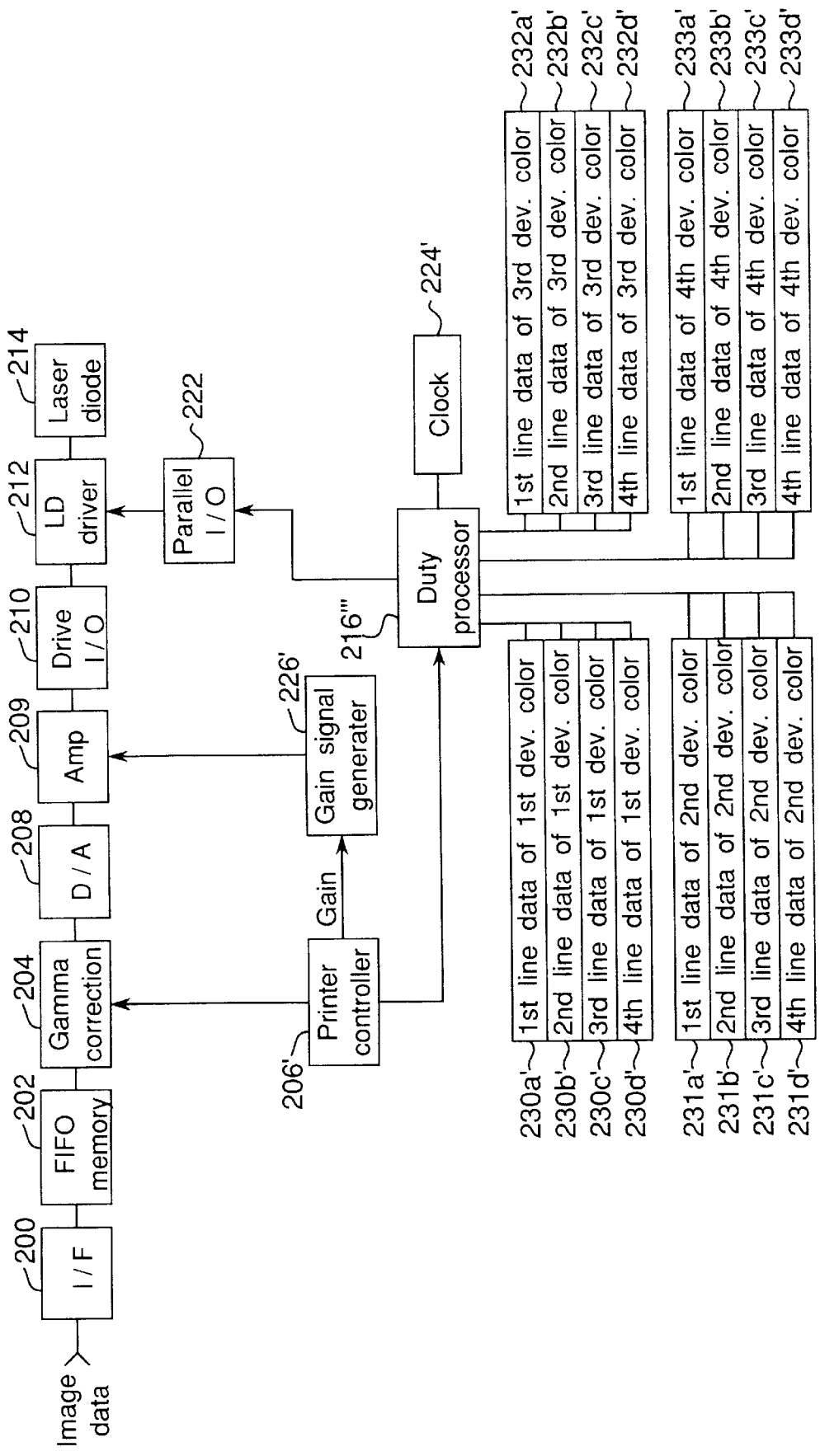
FIG. 22 is a block diagram of image data processing in a printer in a fourth embodiment.
Figure 23A:
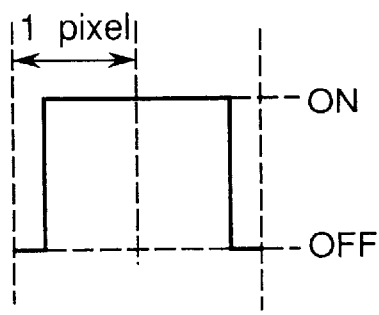
FIGS. 23A, 23B, 23C and 23D are timing charts of an example of duty signals for a first development color for a first line, for a second line, for a third line and for a fourth line.
Figure 23B:
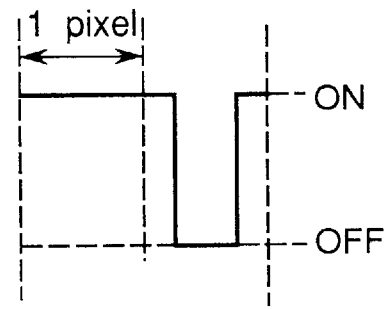
Figure 23C:
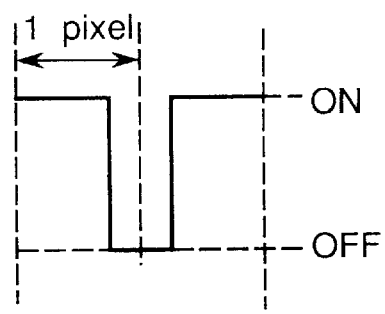
Figure 23D:
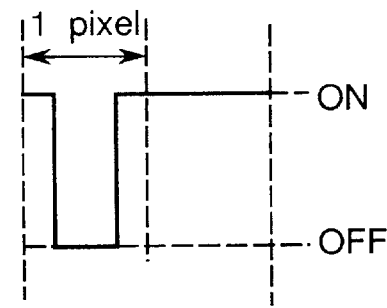
Figure 24A:
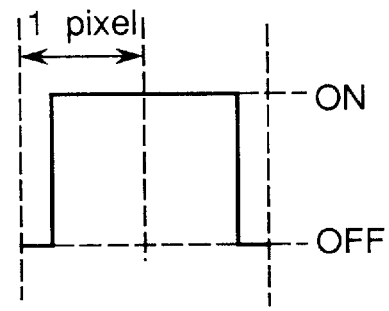
FIGS. 24A, 24B, 24C and 24D are timing charts of an example of duty signals for a second development color for a first line, for a second line, for a third line and for a fourth line.
Figure 24B:
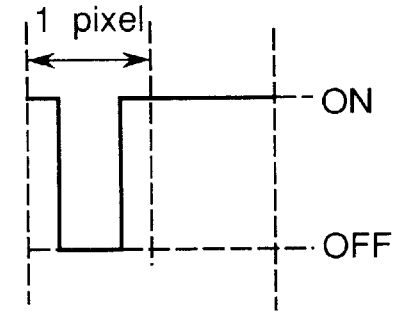
Figure 24C:
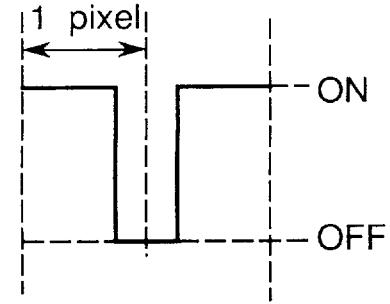
Figure 24D:
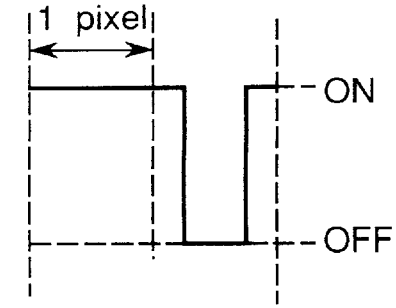
Figure 25A:
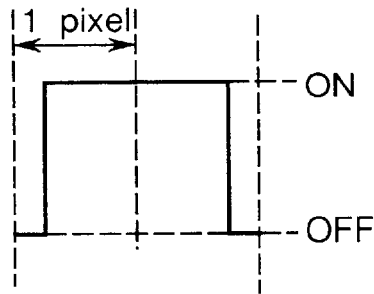
FIGS. 25A, 25B, 25C and 25D are timing charts of an example of duty signals for a third development color for a first line, for a second line, for a third line and for a fourth line.
Figure 25B:
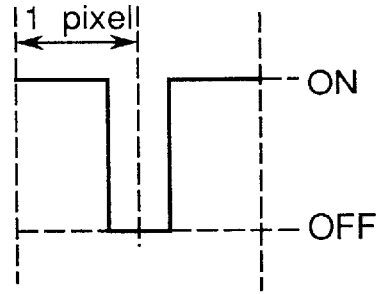
Figure 25C:
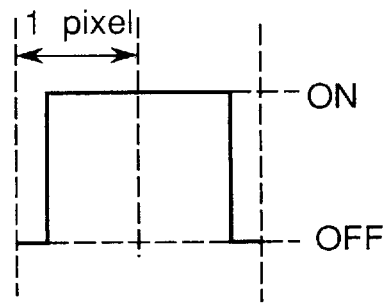
Figure 25D:
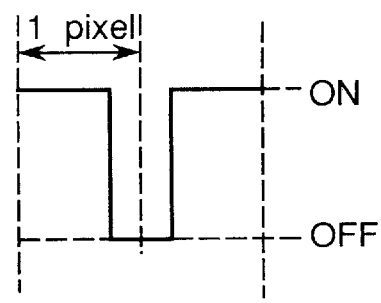
Figure 26A:
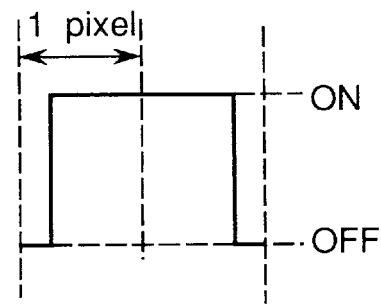
FIGS. 26A, 26B, 26C and 26D are timing charts of an example of duty signals for a fourth development color for a first line, for a second line, for a third line and for a fourth line.
Figure 26B:
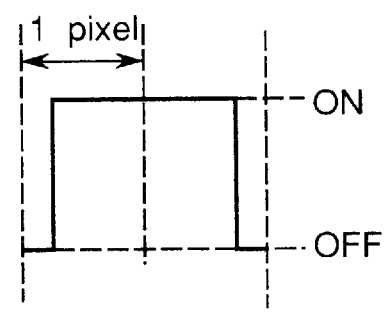
Figure 26C:
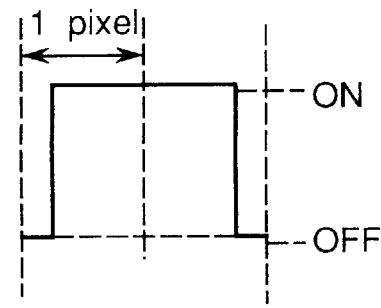
Figure 26D:
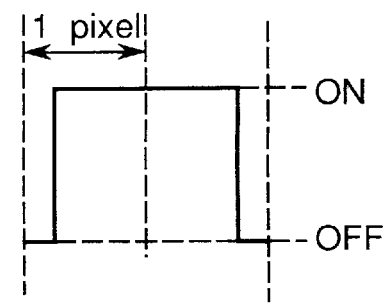
Figure 27:
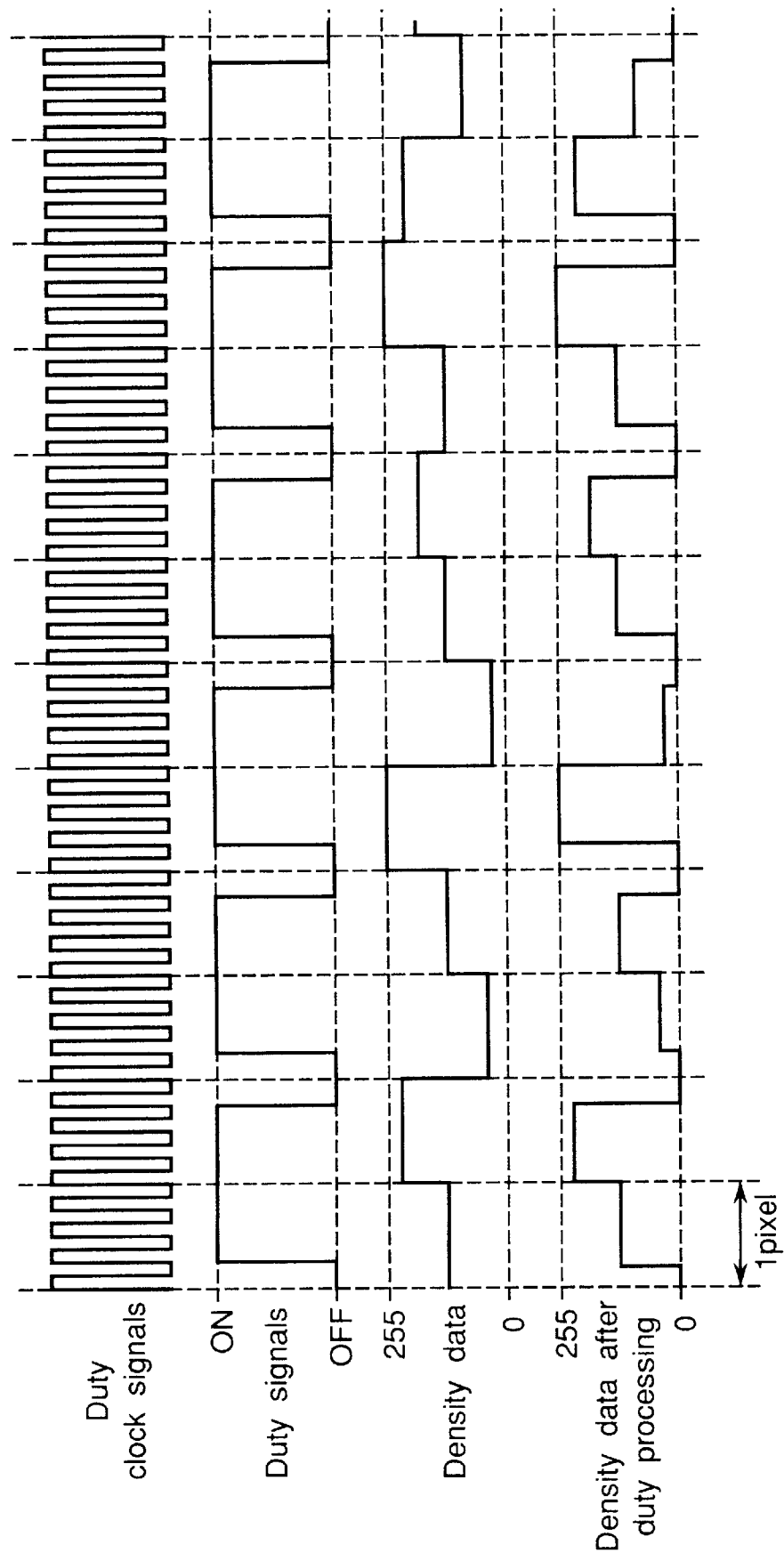
FIG. 27 is a timing chart of an example of duty clock signal, duty signal and density data for a first line of a first development color.
Figure 28:
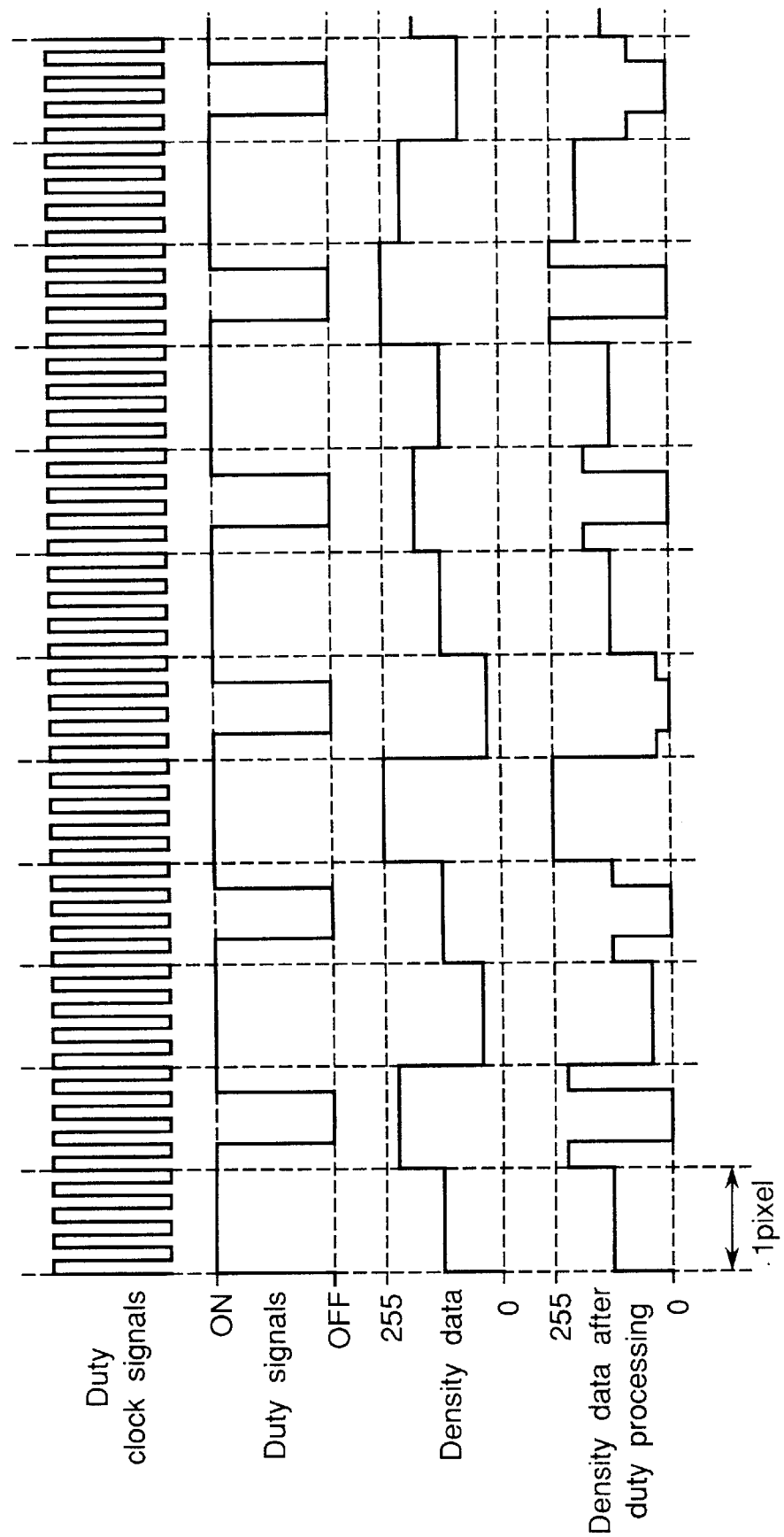
FIG. 28 is a timing chart of an example of duty clock signal, duty signal and density data for a second line of the first development color.
Figure 29:
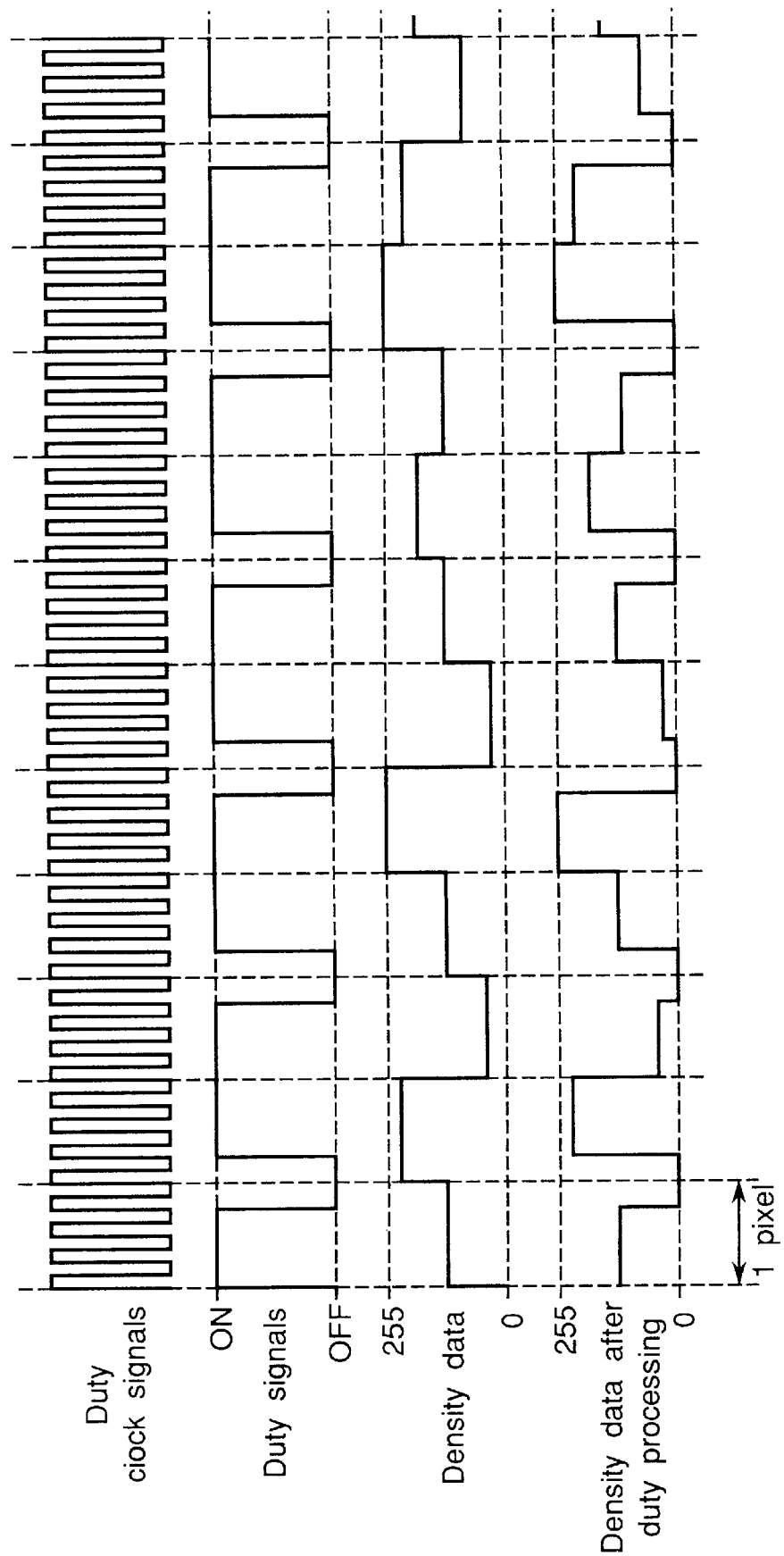
FIG. 29 is a timing chart of an example of duty clock signal, duty signal and density data for a third line of the first development color.
Figure 30:
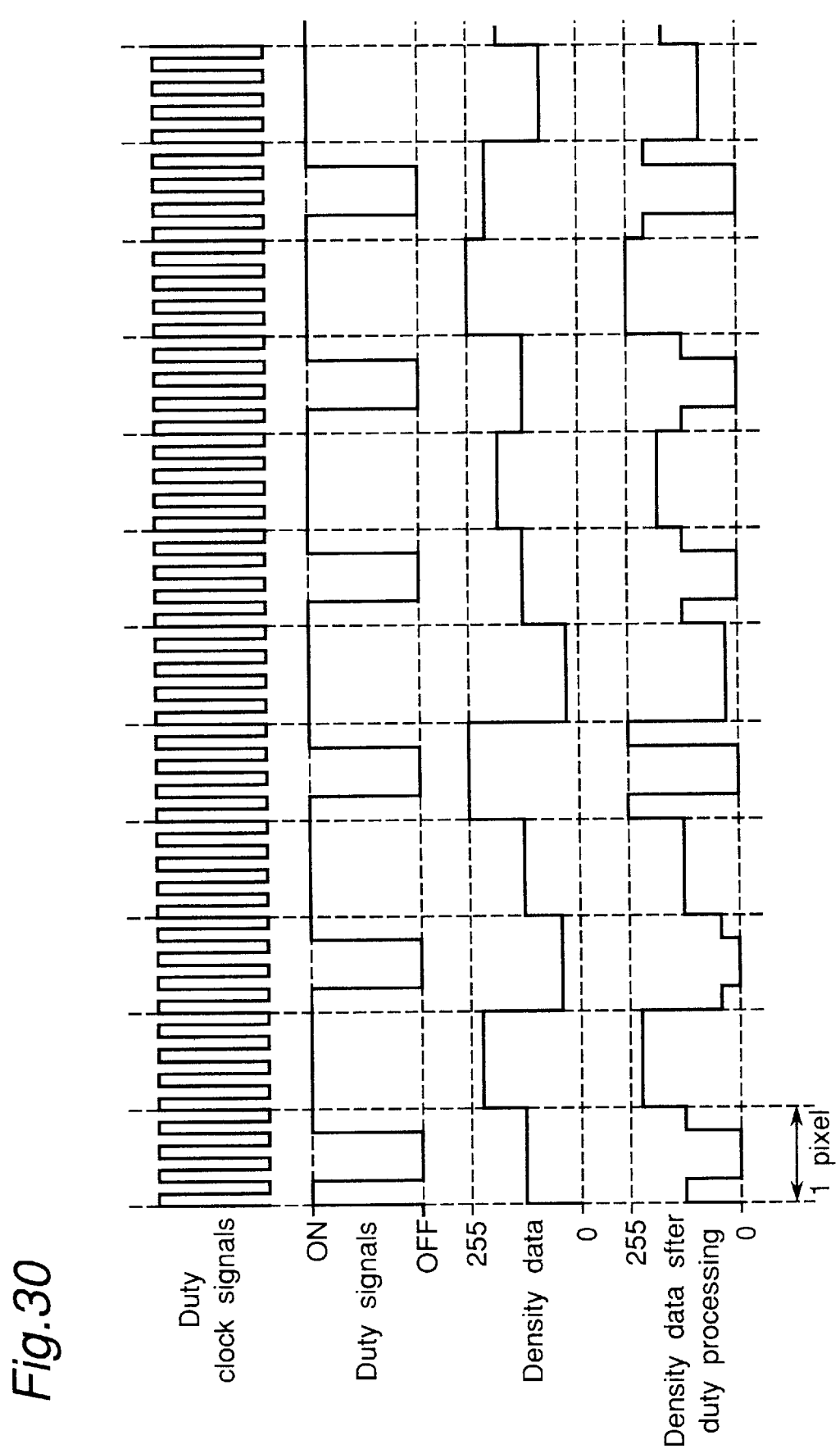
FIG. 30 is a timing chart of an example of duty clock signal, duty signal and density data for a fourth line of the first development color.
Figure 31:
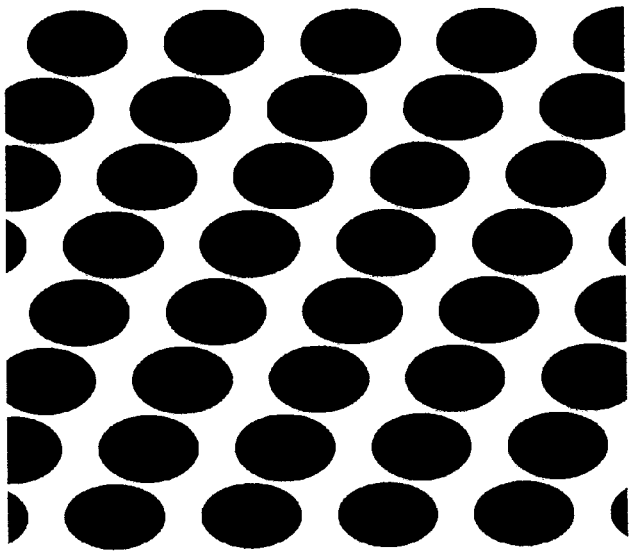
FIG. 31 is a diagram of an example of a dot pattern of the first development color in the fourth embodiment.
Figure 32:
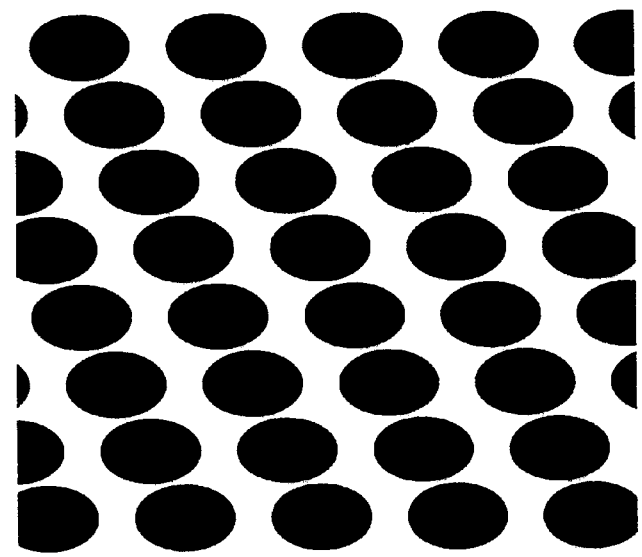
FIG. 32 is a diagram of an example of a dot pattern of a second development color in the fourth embodiment.
Figure 33:
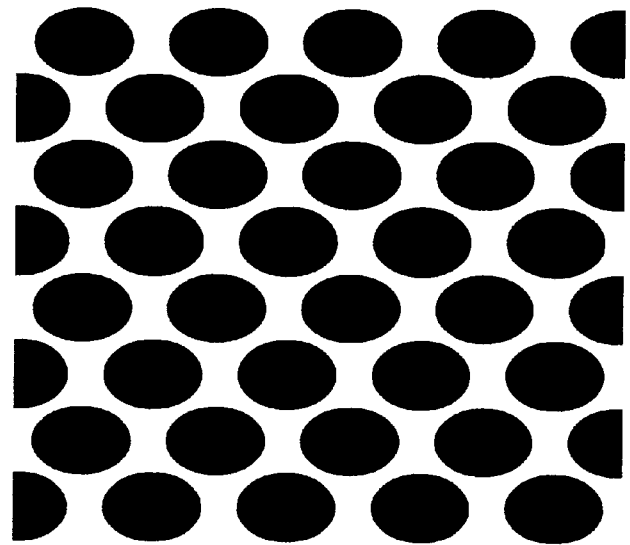
FIG. 33 is a diagram of an example of a dot pattern of a third development color in the fourth embodiment.
Figure 34:
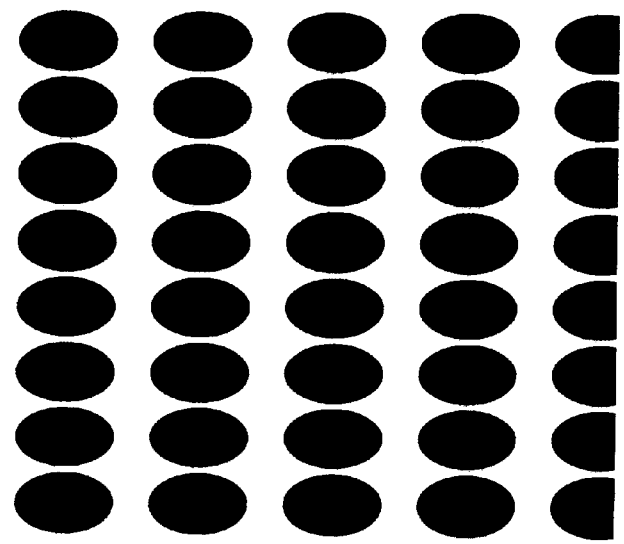
FIG. 34 is a diagram of an example of a dot pattern of a fourth development color in the fourth embodiment.

Next, a fourth embodiment of the invention is explained where screen angles of the first to fourth development colors are changed. Only differences from the third embodiment are explained. FIG. 22 shows image data processing in a printer 1 in this embodiment. The image data processing is different from that of the third embodiment shown in FIG. 17 in that duty data processed by a duty processor 216"' are different. The duty data are as follows: first line data 230a' (refer to FIG. 23A), second line data 230b' (refer to FIG. 23B), third line data 230c' (refer to FIG. 23C) and fourth line data 230d' (refer to FIG. 23D) for a first development color; first line data 231a' (refer to FIG. 24A), second line data 231b' (refer to FIG. 24B), third line data 231c' (refer to FIG. 24C) and fourth line data 231d' (refer to FIG. 24D) for a second development color; first line data 232a' (refer to FIG. 25A), second line data 232b' (refer to FIG. 25B), third line data 232c' (refer to FIG. 25C) and fourth line data 232d' (refer to FIG. 25D) for a third development color; and first line data 233a' (refer to FIG. 26A), second line data 233b' (refer to FIG. 26B), third line data 233c' (refer to FIG. 26C) and fourth line data 233d' (refer to FIG. 26D) for a fourth development color. These duty data are stored in a memory. When the duty processor 216"' receives a signal from a printer controller 206' for starting reproduction, it sends one of the duty signals such as 230a' through a parallel input/output circuit 222 to a laser diode driver 212.

FIGS. 23–26 show timing charts of an example of duty signals for each of the first to fourth development colors for first to fourth lines. The light-emission patterns shown in FIGS. 23–26 have a period of two pixel and a duty ratio of 75%. The first to fourth development colors defined for the duty data in this embodiment are also related to the order of image forming process, as in the third embodiment. However, it is to be noted that the light-emission timings of the duty data are changed to form screen angles of −26.6° for the first development color, 26.6° for the second one, 0° for the third one and 45° for the fourth one.

FIGS. 27–30 show timing charts of an example of duty clock signal, duty signal and density data for first, second, third and fourth lines of the first development color. Similarly to the timing charts in the first embodiment shown in FIGS. 8 and 9, duty clock signals have a period of four times that of modulation frequency. The duty ratio is 75%, and a period of the duty signal is two pixels. The density data are modulated with the duty signal, and similar results are obtained except the phase of the resultant signals. Optical intensity of laser beam of the laser diode 214 is modulated according to density data. The LD driver 212 processes the density data with the duty ratio to generate the density data shown at the bottom in these drawings.

In the optical system shown in FIG. 10, when an image of a first development color is reproduced, the photodiode 163 detects a start of scan of a first scan line, and a scan of the first scan line is started according to the optical intensity, the duty data 230a' for a first line and the clock signals received through the drive input/output circuit 210 and the parallel input/output circuit 222. When the photodiode 163 detects a start of scan of a second scan line, a scan of the second scan line is performed similarly by using the duty signal 230b' for the second line. Similarly, when the photodiode 163 detects a start of scan of third and fourth scan lines, scan of the third and fourth scan lines are performed similarly by using the duty signals 230c', 230d' for the third and fourth lines. The duty data 230a' for the first line is used for fifth, ninth, . . . , (4n−3)-th lines (where n is a natural number), the duty data 230b' for the second line is used for sixth, tenth, . . . , (4n−2)-th lines, the duty data 230c' for the third line is used for seventh, eleventh, . . . , (4n−1)-th lines, and the duty data 230d' for the fourth line is used for eighth, twelfth, . . . , 4n-th lines. Thus, a latent image is formed in an effective image area. Images of the second, third and fourth development colors are also reproduced similarly by using the duty data 231a'–231d', 232a'–232d', 233a'233d' for the second, third and fourth development color.

After images of the four colors are completed to form a full color image on a paper, the paper is separated from the transfer drum 20 and carried by the carrier 27 to the fixing unit 30. Then, the toner image is fixed and discharged onto the tray 31.

FIGS. 31, 32, 33 and 34 show examples of dot patterns of the first, second, third and fourth development colors formed by changing light-emission timings from the first to fourth lines, where solid dots illustrate schematically toner images formed on a sheet of paper. It is apparent that dot-like images can be formed by using the intensity modulation technique and the screen angles thereof are different among the development colors. Then, pitch noises due to fine lines due to duty ratio can be prevented.

In the third and fourth embodiments, a color Moire pattern can be reduced by changing emission timings among development colors. Further, because laser energy is concentrated in ON periods of the light emission timings, a latent image can be formed surely, so that reproducibility at a highlighted portion in an image can be improved, and random noises are reduced. Further, by shifting dot points between lines, dot distance can be increased, and reproducibility of each dot is improved.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital image forming apparatus comprising:

a light-emitting means for exposing a photoconductor with a light beam by modulating an optical intensity of the light beam for each pixel according to image density data for gradation expression;

a memory means for storing a first light emission timing pattern having a frequency and for defining a light-emission period during which the light beam as modulated according to the image density data is allowed to expose the photoconductor and a non-light-emission period during which the light beam is not allowed to expose the photoconductor, said memory means for storing a second light emission timing pattern having a same frequency as said first light emission timing pattern, said first light emission timing pattern and said second light emission timing pattern being out of phase with respect to each other;

an image reproducing means for reproducing an image on a sheet of paper according to a latent image formed on the photoconductor by said light-emitting means; and a controller for controlling light emission timing of said light-emitting means for a scan line to be formed according to one of the light-emission timing patterns stored in said memory means.

2. The apparatus according to claim 1, wherein said controller uses the first light emission timing pattern for odd lines and the second light emission timing pattern for even lines.

3. The digital image forming apparatus according to claim 2, wherein the controller controls the light-emitting means according to the image density data and one of the light emission timing patterns stored in the memory means.

4. A digital color image forming apparatus which forms images of a plurality of reproduction colors successively to form a color image, the apparatus comprising:

a light-emitting means for exposing the photoconductor with a light beam by modulating an optical intensity of the light beam for each pixel according to image density data for gradation expression;

a memory means for storing a first light emission timing pattern having a frequency and for defining a light-emission period during which the light beam as modulated according to the image density data is allowed to expose the photoconductor and a non-light-emission period during which the light beam is not allowed to expose the photoconductor, said memory means for storing a second light emission timing pattern having a same frequency as said first light emission timing pattern. said first light emission timing pattern and said second light emission timing pattern being out of phase with respect to each other;

an image reproducing means for reproducing an image made of a plurality of reproduction colors on a sheet of paper according to a latent image formed on the photoconductor for each reproduction color by said light-emitting means; and a controller for controlling light emission by said light-emitting means for a scan line to be formed according to one of the light-emission timing patterns stored in said memory means.

5. The apparatus according to claim 3, wherein said controller uses the first and second light emission timings stored in said memory means in turn as a reproduction color is changed.

6. A digital color image forming apparatus which forms images of a plurality of reproduction colors successively to form a color image, the apparatus comprising:

a light-emitting means for exposing a photoconductor with a light beam by modulating an optical intensity of the light beam for each pixel according to image density data for gradation expression;

a memory means for storing a plurality of sets of a first light emission timing pattern and a second light emission timing pattern, each of said first and second light-emission timing patterns for defining a light-emission period during which the light beam as modulated according to the image density data is allowed to expose the photoconductor and a non light-emission period during which the light beam is not allowed to expose the photoconductor, each of said first and second light-emission timing patterns being independent of densities of the image density data;

an image reproducing means for reproducing an image on a sheet of paper according to a latent image formed on the photoconductor by said light-emitting means; and a controller for controlling light emission by said light-emitting means according to the first and second light-emission timing patterns in one of the sets stored in said memory means during the formation of said latent image on said photoconductor.

7. The apparatus according to claim 6, wherein said controller uses the first light-emission timing pattern for odd lines and the second light emission timing pattern for even lines.

8. The apparatus according to claim 6, wherein non-light-emission portions in the first and second light emission patterns of one of the sets are included in light-emission portions in the first and second light emission patterns in another of the sets.

9. The apparatus according to claim 6, wherein said memory means stores the first light emission timing pattern and the second light emission timing pattern defined for each of predetermined reproduction colors.

10. The apparatus according to claim 6, wherein said controller uses the sets in turn as a reproduction color is changed.

11. A digital color image forming apparatus which forms images of a plurality of reproduction colors successively to form a color image, the apparatus comprising:

a light-emitting means for exposing the photoconductor with a light beam by modulating an optical intensity of the light beam for each pixel according to image data for gradation expression;

a memory means for storing a plurality of sets, each of said sets including light emission timing patterns for defining a plurality of successive lines for providing a predetermined screen angle;

an image reproducing means for reproducing an image on a sheet of paper according to a latent image formed on the photoconductor by said light-emitting means; and a controller for controlling light emission by said light-emitting means for a line to be formed according to one of the light-emission timing patterns in one of the sets stored in said memory means.

12. The apparatus according to claim 11, wherein non-light-emission portions in the first and second light emission patterns of one of the sets are included in light-emission portions in the first and second light emission patterns in another of the sets.

13. The apparatus according to claim 11, wherein the screen angle is different among the reproduction colors.

14. The apparatus according to claim 11, wherein the screen angle is the same for the reproduction colors.

15. The apparatus according to claim 11, wherein said controller uses the sets in turn as a reproduction color is changed.

16. A digital image forming apparatus comprising:

a light source which emits a light beam;

a driver which drives said light source to modulate an optical intensity of the emitted light beam for each pixel according to image density data for gradation expression; and a controller which controls a phase of a light emission timing pattern having a constant frequency along a scan line, said light emission timing pattern having a light-emission period during which the optical intensity of the light beam is modulated according to the image density data and a non-light-emission period.

17. The digital image forming apparatus as claimed in claim 16, wherein said controller changes the phase of the light emission timing pattern for each scan line.

18. The digital image forming apparatus as claimed in claim 16, wherein said controller changes the phase of the light emission timing pattern for different colors.

19. The digital image forming apparatus as claimed in claim 16, wherein said controller changes the phase of the light emission timing pattern according to an order of the image forming condition.

20. The digital image forming apparatus as claimed in claim 16, wherein a width of said emission period is independent of a density level of the image density data.

21. A digital image forming apparatus comprising:

a light-emitting device for exposing a photoconductor with a light beam by modulating an optical intensity of the light beam for each pixel according to image density data for gradation expression;

an image reproducing device for reproducing an image on a sheet of paper according to a latent image formed on the photoconductor by said light-emitting device;

a memory for storing a first light-emission timing pattern and a second light-emission timing pattern; and a controller for controlling light-emission timing of said light-emitting device for a first scan line of an image to be formed according to the first light-emission timing pattern and for controlling light emission timing of said light-emitting device for a second scan line of said image to be formed according to the second light-emission timing pattern.

22. The apparatus according to claim 21, wherein said first light-emission timing pattern and said second light emission timing pattern have a same frequency and are out of phase with respect to each other.

23. The apparatus according to claim 21, wherein said controller controls light-emission timing of said light-emitting device for a first reproduction color according to said first light-emission timing pattern and controls light-emission timing of said light-emitting device for a second reproduction color according to said second light-emission timing pattern.

24. The apparatus according to claim 21, wherein said controller controls light-emission timing of said light-emitting device so that a screen angle for a first reproduction color is different than a screen angle for a second reproduction color.

25. The apparatus according to claim 21, wherein the controller is operable to control the light emission by said light-emitting device according to the first and second light-emission timing patterns stored in said memory so that a screen angle for one of said reproduction colors is different than a screen angle for another of said reproduction colors.

* * * * *